US006484261B1

(12) United States Patent
Wiegel

(10) Patent No.: US 6,484,261 B1
(45) Date of Patent: Nov. 19, 2002

(54) GRAPHICAL NETWORK SECURITY POLICY MANAGEMENT

(75) Inventor: Scott L. Wiegel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/210,143

(22) Filed: Dec. 11, 1998

Related U.S. Application Data

(60) Provisional application No. 60/074,945, filed on Feb. 17, 1998.

(51) Int. Cl.[7] .............................................. G06F 11/30
(52) U.S. Cl. ...................... 713/201; 345/763; 345/967
(58) Field of Search ............................. 713/200, 201; 709/223, 224, 226, 229, 230; 345/763, 967

(56) References Cited

U.S. PATENT DOCUMENTS 5,835,726 A  * 11/1998  Shwed et al. ............... 713/200

* cited by examiner

Primary Examiner—Gail Hayes
Assistant Examiner—Jenise Jackson
(74) Attorney, Agent, or Firm—Hickman Palermo Truong & Becker LLP

(57) ABSTRACT

A method of establishing a representation of an abstract network security policy is disclosed. The representation is established in the form of a decision tree that is constructed by assembling graphical symbols representing policy actions and policy conditions. A user modifies properties of the graphical symbols to create a logical representation of the policy. Concurrently, the logical representation is transformed into a textual script that represents the policy, and the script is displayed as the user works with the logical representation. When the policy representation is saved, the script is translated into machine instructions that govern the operation of a network gateway or firewall. The policy representation is named. The policy representation may be applied to other network devices or objects by moving an icon identifying the representation over an icon representing the network device. Policies, network objects, and network services are stored in the form of trees.

17 Claims, 15 Drawing Sheets

GRAPHICAL NETWORK SECURITY POLICY MANAGEMENT

PRIORITY CLAIM

The applicants claim domestic priority under 35 U.S.C. § 119(e) from prior provisional application Ser. No. 60/074,945, filed Feb. 17, 1998, entitled "Graphical Network Security Policy Management."

FIELD OF THE INVENTION

The present invention generally relates to managing data communication policies for network devices. The present invention relates more specifically to graphical management of data communication policies in a network management system.

BACKGROUND OF THE INVENTION

Administrators of computer networks generally think of network security in terms of abstract security policies. The administrators design the security policies to protect their organization's information resources against threats that may compromise the confidentiality, integrity, or availability of sensitive data. However, the way that people conceptualize security policies does not match the way that they must implement them using conventional, rule-based security policy models.

A computer network generally includes a number of devices, including switches and routers, connected so as to allow communication among the devices. The devices are often categorized into two classes: end stations such as work stations, desktop PCs, printers, servers, hosts, fax machines, and devices that primarily supply or consume information; and network devices such as switches and routers that primarily forward information between the other devices. In this context, the term "administrators" refers to the people who are in charge of interpreting an organization's security policy as it applies to network usage. They are also responsible for writing and applying the security policy. The term "users" refers to people working in the same organization as the administrators and who depend on the network to perform their jobs.

A network security policy defines rules for allowing or disallowing a specific type of network traffic by a specific user or group of users, or a specific end station or group of end stations, under specific conditions. Its purpose is to protect the organization's information resources based on expectations of proper computer and network use. To adequately protect an organization's information assets, an administrator must develop a comprehensive set of security policies that covers all types of network traffic for each user or object at the organization under each set of operational conditions.

The network devices enforce the security policies. The functions of network devices such as switches and routers include receiving packets of data, and determining whether to forward each packet to another device or location, or to refuse to forward a packet. The particular way that these functions operate is determined, in part, by control instructions stored in the network device.

Currently, security policies are generally prepared using an ordered list of rules. In past approaches, the network devices are designed to interact with operating systems having text-based, command-line interfaces. Because of these interfaces, administrators had to learn the command sets that controlled how the devices operated. The command sets were, and still are, cryptic and difficult to use. The command sets differ from one network device vendor to the next. Moreover, the relationship between different lines of a command set may cause problems; a previous rule may affect the execution of all later rules, or even prevent their use. These inter-relationships are difficult to remember or track.

For example, a router is programmed using a set of router rules that determine whether the router should forward or reject packets based upon the type of packet, originating network location, destination location, and other criteria. The following example presents a rule set used to program a router to allow traffic across it for an anonymous file transfer protocol (FTP) server that resides on a network object having an Internet Protocol (IP) address of 192.10.1.2:

recv/syn/dstport=ftp/dstaddr=192.10.1.2
    !recv/syn/dstport=ftp
    syn/dstport=1024-65535

This "router-based rule set" approach suffers from the significant drawback that a collection of router rules rapidly becomes complex, difficult to understand, and hard to maintain. Sets of router rules resemble computer programs written in procedural programming languages. The rule sets can be difficult to manage or decipher regardless of the administrator's level of expertise.

Indeed, one problem of the router rule-based approach is that it is too much like computer programming. There is exploding demand to construct and connect to networks, and such demand far exceeds the available supply of human networking experts who are familiar with router-based rule sets, or with command-line operating systems. Presently, human network administrators are not generally trained in computer programming. Thus, there is a need for a way to instruct a router in how to handle data passed through the router, without requiring a network administrator to know or understand a complex computer language.

Another type of network device is called a firewall. One type of firewall is known as a packet filter. Because packet filters perform functions very similar to the functions of routers, router-based command sets were used to develop the first generation of packet filtering firewalls. These command sets required that each network object protected by the firewall have an individual rule associated with it for each network service to which that network object was allowed access. In this context, a network object is any addressable entity in the network, such as an end station, subnet, or router.

Eventually, when other firewall mechanisms such as proxy services, dynamic packet filters, and circuit-level firewalls were developed, their designs incorporated similar router-based rule sets. Because these new architectures introduced additional security features and options, the command sets grew more complicated and became network-service specific. The following example is typical of a set of rules required to provide hosts having IP addresses of 192.10.1.* with access to FTP:

ftp-gw: denial-msg /usr/local/etc/ftp-deny.txt
    ftp-gw: welcome-msg /usr/local/etc/ftp-welcome.txt
    ftp-gw: help-msg /usr/local/etc/ftp-help.txt
    ftp-gw: timeout 7200
    ftp-gw: permit-hosts 192.10.1.* -log (retr stor)

Clearly, there is a need for mechanisms and methods to control network devices such as firewalls without the use of arcane, command-based router rule sets.

Some makers of firewalls have responded to the foregoing problems by providing firewall programming interfaces that have icons and property sheets. Each icon represents a specific rule type, such as the "ftp-gw" rule in the example above. The property sheets organize the various options for a specific rule type, allowing the administrator to specify the settings for a particular instance of a rule. The icons are intended to make the command-line policy lists more "user friendly."

However, the icon interface approach does not deal with a number of fundamental problems of command-line rule lists. For example, the administrator must still program using vendor-specific command sets to set up each icon. The administrator is required to have knowledge of low-level network protocol elements and their relationship. Further, the administrator is required to have knowledge about each network object to which the administrator wants to apply a security policy.

In addition, there are several problems associated with managing and maintaining the representations of security policies generated by use of the icon interface. The representations are difficult to conceptualize and relate to an abstract security policy. It is difficult to verify that security policies are applied correctly and consistently to all network objects. It is difficult to define exceptions and changes to security policies. The past approaches do not generally distinguish between users and network objects, and do not permit security policies to be ported to other locations.

The past approaches also have the disadvantage of carrying out sequential processing that is associated with the ordered lists of rules that underlie the representation of a policy.

Another approach, used in prior network devices called firewalls, relies on database tables that describe how to handle data packets arriving from particular locations or services. The firewalls are instructed by preparing a set of instructions derived from the rows, columns, and logical relationships of the tables. Generally, the table-based languages are arcane and hard to use.

The cryptic command sets and low-level knowledge about networks and network protocols required to program rule-based security policies are complicated for administrators to learn. In developing and deploying rule-based security policies, administrators are often required to gain specific knowledge about how the security policies protect their specific networks. This network-specific knowledge about how security policies are deployed makes it difficult for administrators of complex networks to assign seemingly trivial tasks to less experienced staff, such as "Go turn off the access to our FTP servers by the marketing department." While this added burden does create job security, it also undesirably drives up the cost of experienced network administrators.

Management of a large, complicated network made up of diverse devices is made easier by mechanisms that allow information about all policies for devices in the network to be viewed at a graphical workstation. It is highly desirable to obtain this information in an automated way at a workstation that uses a standard graphical user interface, without requiring a network administrator to know the icons or rules.

Network management systems address this general need. To monitor the status of a device in the network, a network management station transmits a message requesting information to a software program or agent running on the target device. In response, the agent sends a message back to the network management station. The communications are carried out according to an agreed-upon protocol, such as the Simple Network Management Protocol (SNMP). The communications can be done over the network ("in-band") or by directly contacting a device through means separate from the network in which the device is used ("out of band"). In some configurations, the management station sends a request for information to a proxy rather than the actual device; the proxy then interacts with the device to decide what the response should be, and replies to the management station.

One approach is to provide a network management system that presents a graphical view of the arrangement and interconnections of network devices on the screen of a workstation. The network is represented as a set of miniature icons, each of which represents a network device, interconnected by lines that represent electrical connections. An example of such a system is the Cisco Works for Switched Internetworks (CWSI) product available from Cisco Systems, Inc., of Santa Clara, Calif. However, the geographic scope of a network can present other difficulties in using this type of network management tool. A network can connect multiple buildings of an office campus, or multiple facilities in different cities. Networks of this type often have thousands of devices. As a result, it is impractical to view a graphical representation of the entire network. Therefore, it is desirable to establish groups of devices in the network and to provide a view of only devices that are in each group.

Thus, there is a need for a method or mechanism to construct a network security policy without the use of a list of rules. In particular, there is a need for a way to construct a network security policy that is easily understood by a network administrator, that avoids the use of router-based rule sets, and in which an abstract security policy is easily correlated with a representation of the policy.

Further, there is a need for a way to create and manage network security policies having an improved graphical user interface.

There is also a need for a way to create and manage network security policies in a device-independent manner, so that the same creation mechanism can be used in connection with a network device made by any vendor.

There is also a need for a way to construct a representation of a network security policy in which the representation is easily correlated with the policy. There is a particular need for such a mechanism that does not require the administrator to have knowledge about low-level network protocol details and about the particular network protocols that are used by application programs.

Further, there is a need for a security policy management mechanism in which a policy can be defined once and applied to numerous network devices or objects. There is a particular need for such a mechanism in which policies can be ported from one network to another.

There is also a need for a mechanism in which changes or error corrections to one policy are automatically propagated to other instances of the policy and to all network objects to which the policy has been applied.

There is also a need for a policy management mechanism that can distinguish between users and network objects when policies are created and applied.

SUMMARY OF THE INVENTION

The foregoing needs, and other needs and objects that will become apparent from this document, are realized in the present invention, which comprises, in one aspect, a method of establishing a representation of a network security policy. The representation is established in the form of a decision tree that is constructed by assembling graphical symbols representing policy actions and policy conditions. A user modifies properties of the graphical symbols to create a logical representation of the policy. Concurrently, the logical representation is transformed into a textual script that represents the policy, and the script is displayed as the user works with the logical representation. When the policy representation is saved, the script is translated into machine instructions that govern the operation of a network gateway or firewall. The policy representation is named. The policy representation may be applied to other network devices or objects by moving an icon identifying the representation over an icon representing the network device. Policies, network objects, and network services are stored in the form of trees.

According to one aspect, the invention provides a method for controlling a network device that passes or rejects information messages, the method comprising the computer-implemented steps of defining a set of symbols that identify logical operations that can be carried out by the network device; defining an information communication policy for the network device by graphically interconnecting one or more of the symbols into a symbolic representation of the policy; and generating a set of instructions based on the symbolic representation of the policy, wherein the set of instructions causes the network device to selectively pass or reject messages according to the policy.

One feature of this aspect is that the step of defining the set of symbols includes the steps of displaying the set of symbols in a window of a user interface; receiving user input from a user input device coupled to the user interface, in which the user input defines how to manipulate the symbols to create the symbolic representation of the policy. Another feature is that the step of defining the information communication policy includes the steps of receiving editing commands for re-configuring the symbolic representation; re-configuring the one or more symbols into a revised symbolic representation of the policy based on the editing commands; and displaying the revised symbolic representation on the user interface. In a related feature, the step of re-configuring the one or more symbols includes the steps of automatically validating the editing commands according to one or more syntactic rules and based on the context of the editing commands.

In another feature, the step of generating the set of instructions comprises the steps of dynamically updating the set of instructions as the information communication policy is defined. A related feature is that the step of generating the set of instructions comprises the steps of dynamically updating the set of instructions as the symbolic representation is re-configured. Another related feature is that the step of generating the set of instructions comprises the steps of generating a source script that defines the policy in a scripting language; and displaying the source script in a window of the user interface.

According to another feature, the method further involves the steps of, after re-configuring the one or more symbols, highlighting a corresponding portion of the source script that is displayed in the window when one of the one or more symbols is selected by the user. A related feature further involves the steps of naming the source script; storing the source script in a database; and displaying, in a second window of the user interface, a list of one or more source scripts that are stored in the database.

According to another feature, the method further includes the steps of storing a decision tree comprising one or more nodes, in which the decision tree represents a logical flow of commands that are to be executed by the network device; and inserting a node into a decision tree, wherein the node is associated with a symbol that is added to the policy.

The invention encompasses other aspects and has many other features that will become apparent in the following description and from the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
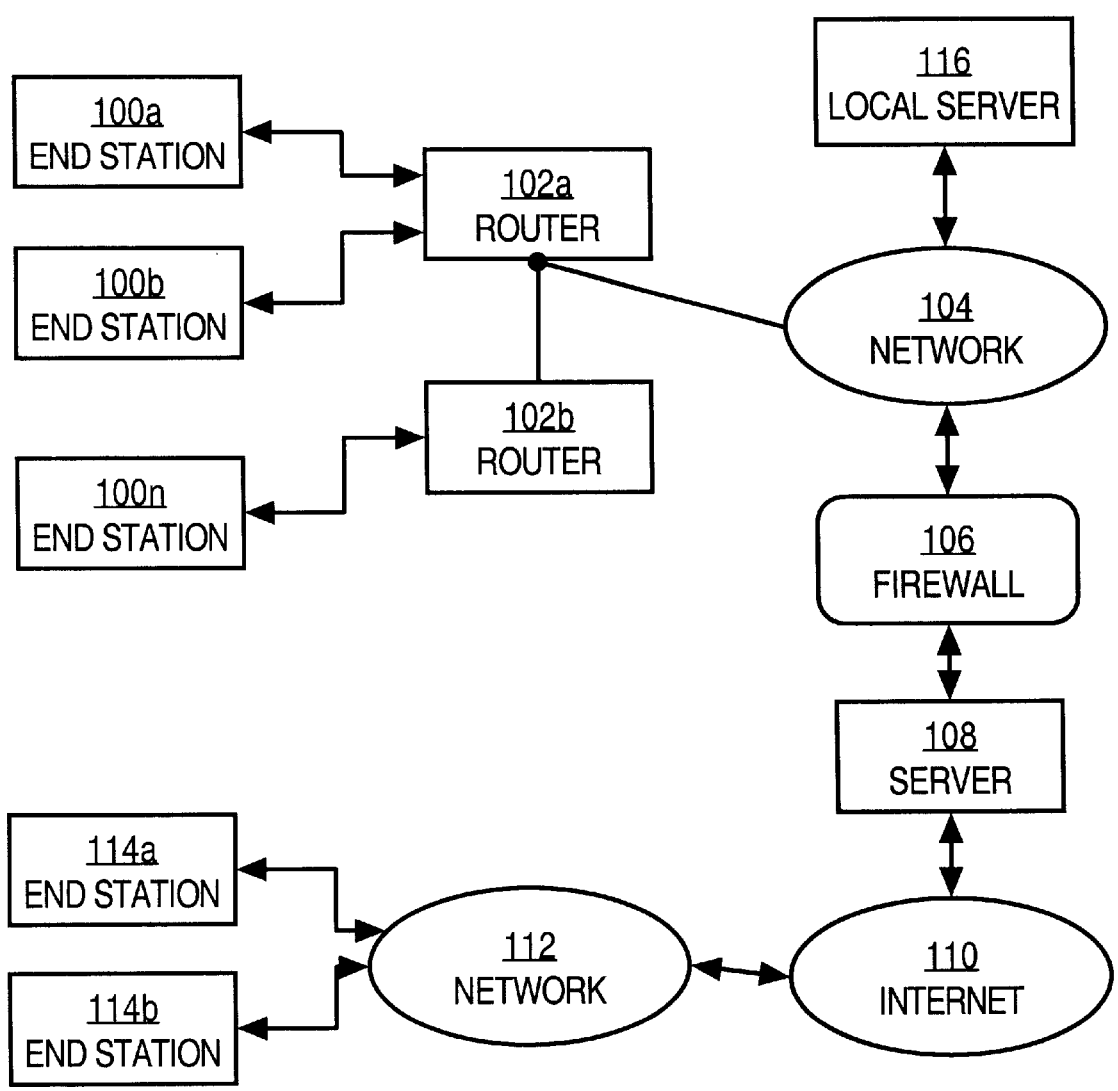
FIG. 1 is a simplified block diagram of a computer network.

A method and apparatus for graphical network policy management is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

SECURITY POLICY MANAGEMENT USING CONVENTIONAL RULE SETS

In the simple environments where rule sets were first designed, rule-based security policies were adequate for managing network traffic. However, increases in the number of network services, the number of users, the complexity of network configurations, and the desired level of administrative control have strained the rule-based model.

In this context, "managing security policies" refers to the day-to-day tasks that administrators perform once a security policy has been deployed. They must modify security policies to reflect changes, such as adding network objects, moving hosts to different subnets, and allowing users to work remotely.

CONCEPTUALIZING THE SECURITY POLICY

To define a security policy using an ordered list of rules, administrators must "flatten" the security policy. It is difficult for administrators to conceptualize a security policy constructed from two lists of rules (an approval rule list and a denial rule list). Administrators think about a security policy differently from how a firewall server enforces the policy.

For example, in the prior approaches, rather than attaching a security policy to a single object that represents the accounting department, administrators must define a collection of instructions within an ordered list. Then, they must ensure that the rules before and after the new instructions do not conflict with the new instructions, which could result in denying the accounting department access or allowing others to access the sensitive accounting information.

Another problem is that application programs sometimes conflict with existing network protocols. Some applications use multiple network protocols, so that to set a proper security policy, the administrator needs to know which protocols various application features use. Further, some network protocols provide the same functions as other network protocols, such as the ability of HTTP to download files using a subset of FTP. Thus, setting a security policy using an ordered rule set is inherently difficult in these contexts.

Consider a security policy that enforces the following rule: "Let internal users browse the Web, and let servers on the Internet place mail on our internal mail server." The following long, complicated ordered list of rules implements this simple policy:

```
#Format of rules. Ports are optional.
#Net. Src      Dest.        Trans.    Src.    Dest. Action
#Lyr. Addr.    Addr.        Prtcl.    Port    Port
#HTTP Out. No multimedia support, FTP traffic, etc.
IP      192.168.1.*    *             TCP     *      80   Allow
#RealPlayer Out.
IP      192.16.68.*    *             TCP     *    7070   Allow
#Mail In.
IP      *              192.168.1.4   TCP     *      25   Allow
#Mail Out.
IP      192.168.1.4    *             TCP     *      25   Allow
```

When protecting complex networks, administrators can define list sets that include hundreds of network objects and support numerous network services. To provide strict control for such networks, they must often develop list sets that contain hundreds of rules.

Moreover, rules are based on the definition of a specific network protocol. The lists of rules are processed in a specific order, and the first rule that satisfies a session request is the rule that is applied to that session. In many cases, a higher-level rule can override a rule that appears lower in the list. This makes it difficult to conceptualize the security policy that is actually being enforced. The problem becomes acute with large lists that deal with multipurpose network protocols.

VERIFYING POLICY CONSISTENCY AND CORRECTNESS

When developing security policies for large networks, administrators often find the long lists of security policy rules difficult to manage. Also, it is extremely difficult to ensure that all of the objects on a network are protected. To do so, administrators must spend a great deal of time evaluating and testing the lists of rules.

While icons and property sheets may make the visual organization of rule type more accessible, they do not reduce the complexity of ensuring that each network object is protected. User interfaces based on this scheme still require individual rules that specify which network services a particular network object can access. Also, each network service is represented by a particular rule type, requiring administrators to use an icon-based command set to define ordered lists of rules. Like the earlier router-based command sets, these icon-based command sets represent a "flattened" list of rules, more easily interpreted by a computer than by an administrator. However, the "graphical" rules sets prevent administrators from performing side-by-side comparisons. Instead, they must review a property sheet associated with a specific rule, close it, and then open the next one.

HANDLING EXCEPTIONS AND CHANGES TO SECURITY POLICIES

To apply exceptions to a general security policy applied to a network (where the network object is a range of addresses), administrators must define a new rule that includes the exceptions. Then, they must add an instance of that new rule to their list for each network object that requires those exceptions.

In addition, a cascading effect results each time an administrator changes a specific type of rule, such as "require user authentication for all FTP access." They must manually locate each instance of that rule type and make the appropriate changes to it. If more than one firewall server exists on a network, the administrators must make the changes to the security policies on each server. For large organizations with numerous network objects that require exceptions and reside on different networks, it is extremely difficult and time consuming to enforce consistent and correct security policies.

DISTINGUISHING BETWEEN USERS AND NETWORK OBJECTS

Because the rule-based mechanisms control network traffic based on the address of a network object, firewalls designed around these mechanisms cannot easily distinguish between a user and a network object's address. Many firewalls "represent" users by linking a user's name to a specific network object's address. However, security policies that use such representations cannot detect when a specific user logs into a computer different from the object to which the user's name is linked. This shortcoming allows users to circumvent security policies by moving to computers that have less restrictive security policies. It also prevents administrators from defining security policies based on an individual's level of trust. Instead, they are forced to apply broad security policies that are more restrictive than necessary.

PORTING SECURITY POLICIES

Another universal shortcoming of rule-based security policy models is that defined security policies are specific to a firewall server. Because the security policies include the network objects' addresses and the rules for routing network packets to those addresses, administrators cannot port them to other firewall servers located on the same or a different physical network.

To port a rule-based security policy, administrators must manually study the policy and duplicate its functionality in a new policy that addresses the different network objects it protects. This method of porting security policies increases the likelihood of errors introduced by typographical mistakes and misinterpretations, even if the original security policy contains no errors. Misinterpretations can be reduced by having the original authors carefully comment the rules and their intended purpose; however, this solution is very time consuming and inefficient.

PROCESSING LISTS OF ORDERED RULES

Rule-based security policies force a firewall server to perform inefficient, linear evaluations. When large sets of ordered rules exist for inbound and outbound session requests, the firewall server can spend a significant amount of time evaluating a list for an applicable rule. It must evaluate each rule in the order written by the administrator against the session request's parameters, such as the network service being requested, the requesting network object, and the destination network object. The worst-case scenario occurs when an organization's security policy does not allow a specific session, but the administrator did not write a rule to explicitly deny it. Most firewalls observe the following basic rule: "if not explicitly permitted, then deny." To implement this rule, the firewalls evaluate the deny list before the accept list. Thus, the firewall server must evaluate every rule that is defined before it denies such a session.

A more common scenario that highlights the inefficiency of a "flattened" security policy occurs when an administrator knows that failing one rule results in the failing of the next n rules. For example, consider a UDP packet that arrives at a firewall server that has a security policy in which all of the rules specific to Transmission Control Protocol (TCP) are placed before any UDP-specific rules. Administrators know that if the packet fails the first TCP-specific rule, then it will fail all of them; however, the firewall server must evaluate each TCP-specific rule against the session parameters before it can evaluate any of the UDP-specific rules.

DECISION TREE MODEL

A system according to the preferred embodiment is implemented based upon decision trees. Each decision tree represents a security policy using a binary tree, rather than using an ordered list of rules. Decision tree-based security policies are applied to each incoming session. By controlling which "sessions" can occur between two network objects, a gateway or firewall that uses the present system secures the flow of network traffic. In this context, a "session" is a single act of communication between two network objects with an explicit start and an explicit end. Each network packet that arrives at the firewall server belongs to an existing session or identifies a request to start a new session. A "session request" identifies a network packet that does not belong to an existing session.

A decision tree represents a security policy. The decision trees are not converted to ordered lists of rules for processing. The decision trees comprise leaf nodes that store low-level, high-speed instructions that control the gateway or firewall. When a packet is received, the gateway or firewall walks the tree and executes the instructions to determine whether to accept or reject the packet.

A decision tree comprises one or more condition branches. A "condition branch" is a statement that represents a decision point in a security policy. Preferably, a condition branch is a statement that comprises one or more conditions terminated by two terminal nodes. A "condition" is a comparative test between administrator-defined values and the actual values of a session request. When the gateway or firewall evaluates a condition, it compares the parameters of a session request against the session controls specified by the administrator. Depending on whether the session request parameters satisfy the condition, the request is either accepted, rejected, processed by the next condition branch, or passed up to the next policy to find a condition that more closely matches the parameters of a particular session request.

The preferred embodiment provides a graphical user interface in which decision trees are displayed in the form of a logical flowchart. Preferably, the decision trees are implemented as graph data structures.

Session controls are criteria that provide the information the firewall or gateway server uses as the basis for making a decision about whether to accept a session request. When a session request is evaluated against a condition, the session request either satisfies the condition or it does not. Depending on whether the session request satisfies the condition, the evaluation branches either down, when it does not satisfy the condition, or to the right when it satisfies the condition. Depending upon whether the next node is a condition node or a terminal node, that session request is reevaluated against the new condition node or a terminal node is applied against that session request.

Decision trees and the graphical symbols that are used to define them provide administrators with a method for defining security policies that is much more intuitive and logical than the rule-based command sets. However, other advantages of the security policy model will become apparent in the following description, when these security policies are combined with other elements of a firewall user interface, and when it is considered how the firewall server evaluates the final representation.

NETWORK CONTEXT

FIG. 1 is a simplified block diagram of a computer network environment that is an example of the context in which the preferred embodiment is used. The computer network environment comprises one or more end stations 100a, 100b, 100n, 114a, 114b, which are devices such as workstations, personal computers, servers, printers, scanners, etc. Each end station 100a–100n, 114a–b is coupled to a network device such as one of the routers 102a, 102b. The routers are coupled to and form a part of a network 104, such as a local area network. The network 104 is coupled to other network devices, end stations, and resources, such as a local file server 116. In this arrangement, one of the end stations 100a is indirectly connected to the local server 116 and the other devices in the network, so that the end station can obtain resources across the network.

The network 104 is also coupled to the global, packet-switched network known as the Internet 110 through a firewall 106. The firewall 106 is a specialized network device that examines data communicated from the Internet 110 and intended for delivery to the network 104, and determines whether the data is permitted to be communicated to the network 104. The firewall 106 also examines data communicated from the network 104 and intended for delivery to the Internet 110, and the firewall determines whether the data may be communicated out of the network 104 to the Internet 110. The firewall 106 also can communicate with one or more servers 108 that are located logically outside the firewall.

At a location logically across the Internet 110, one or more other networks 112 are connected to other end stations 114a, 114b. In this arrangement, the end stations 100a–100n can communicate with the end stations 114a, 114b using standard Internet protocols.

The preferred embodiment is implemented in the form of one or more computer programs or software objects that are executed by the firewall 106. In one embodiment, the firewall 106 includes a computer having the following minimum system components: a central processing unit with a clock speed of 90 MHz or greater; 32MB or more of main memory; two network adapters; a mass storage device such as a hard disk drive having 1 GB of capacity or greater; a CD-ROM drive; a floppy disk drive; a video card that supports a minimum of 800×600 resolution at 8-bit color; and the Microsoft Windows NT® 4.0 operating system.

Figure 2:
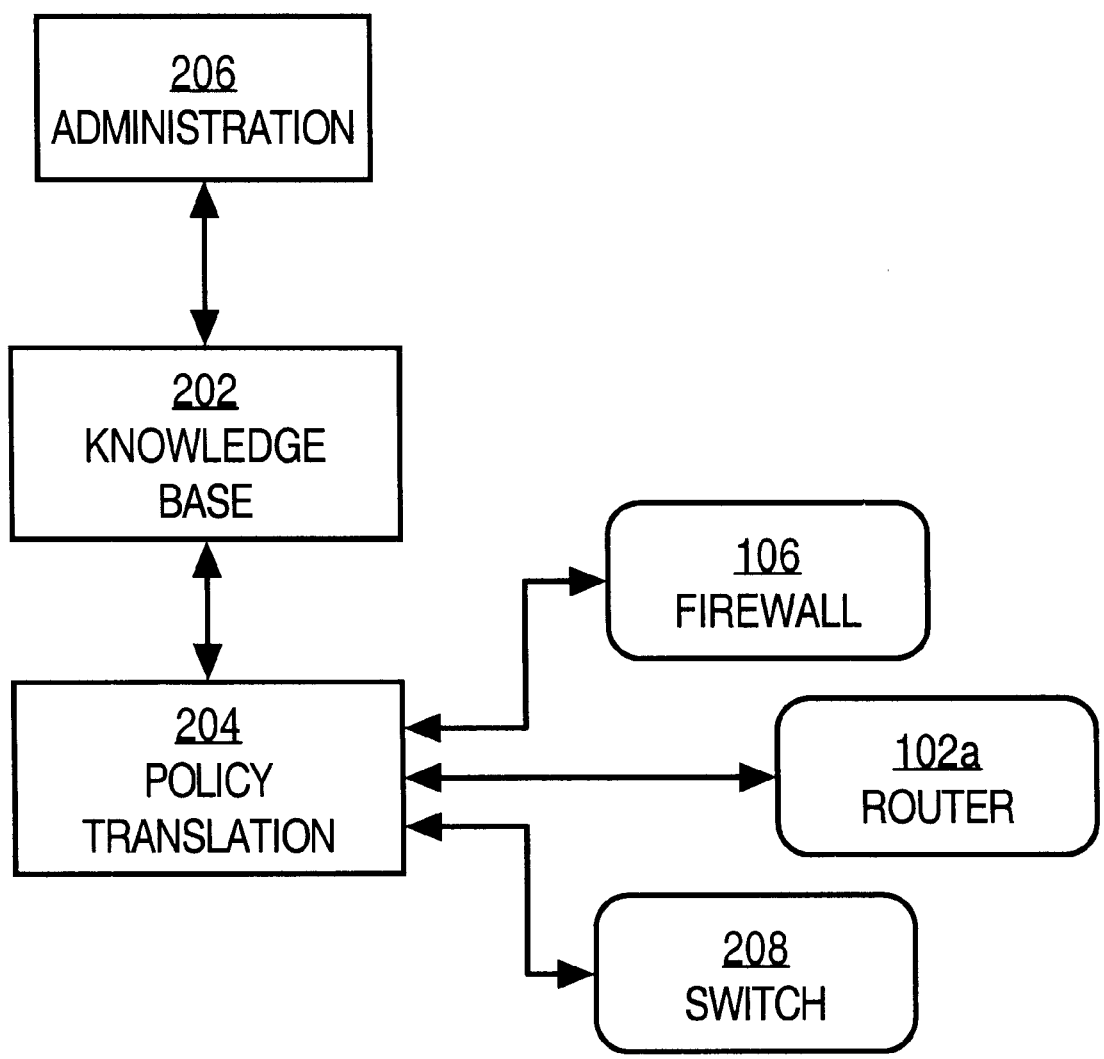
FIG. 2 is a block diagram of a security management system.

FIG. 2 is a simplified block diagram of components of a security system in which a preferred embodiment is used. Generally, the security system comprises autonomous agents that surround a centralized knowledge base 202. The firewall 106, a router 102a, or switch 208 enforce one or more network security policies. Firewall 106, router 102a, and switch 208 may be network devices in one of the networks of FIG. 1.

A policy translation agent 204 is responsible for translating or converting policies as represented in knowledge base 202 into a form that can be understood by firewall 106, router 102a, or switch 208. For example, policy translation agent 204 may translate a policy from a symbolic or pseudocode representation, as described further below, into one or more rules, rule sets or other instructions that are natively understood by firewall 106, router 102a, or switch 208. The system may also include a monitor agent that is responsible for monitoring, reporting, and notification about the security status of the other agents that surround the knowledge base 202.

The administration component 206 provides a unified interface for configuring and maintaining the system. The knowledge base 202 is a centralized database that maintains configuration and system event information. In the preferred embodiment, the knowledge base 202 is an object-oriented, high-speed database such as SQL Server.

The preferred embodiment is implemented as one or more computer programs or software objects in the administration component 206.

REPRESENTING NETWORK PROTOCOLS AND OBJECTS GENERAL

Figure 7A:
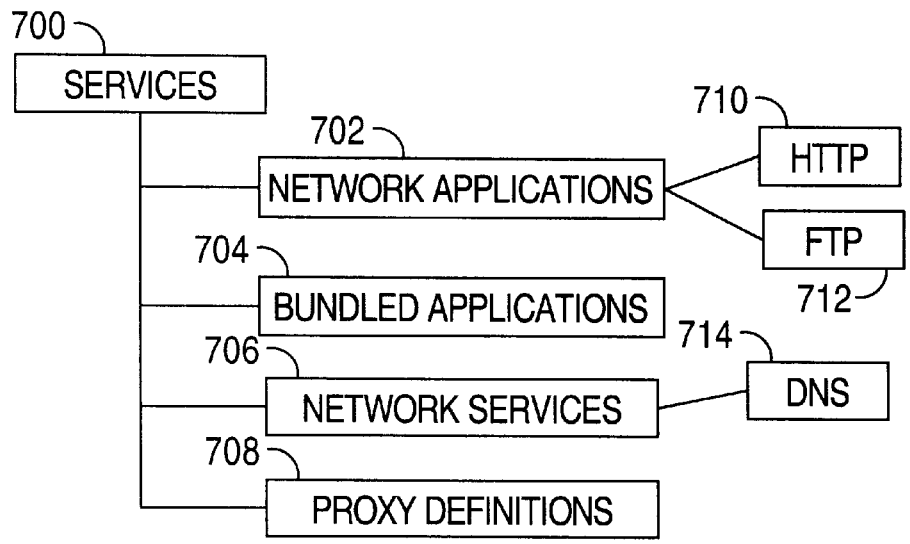
FIG. 7A is a diagram of a services tree.
Figure 7B:
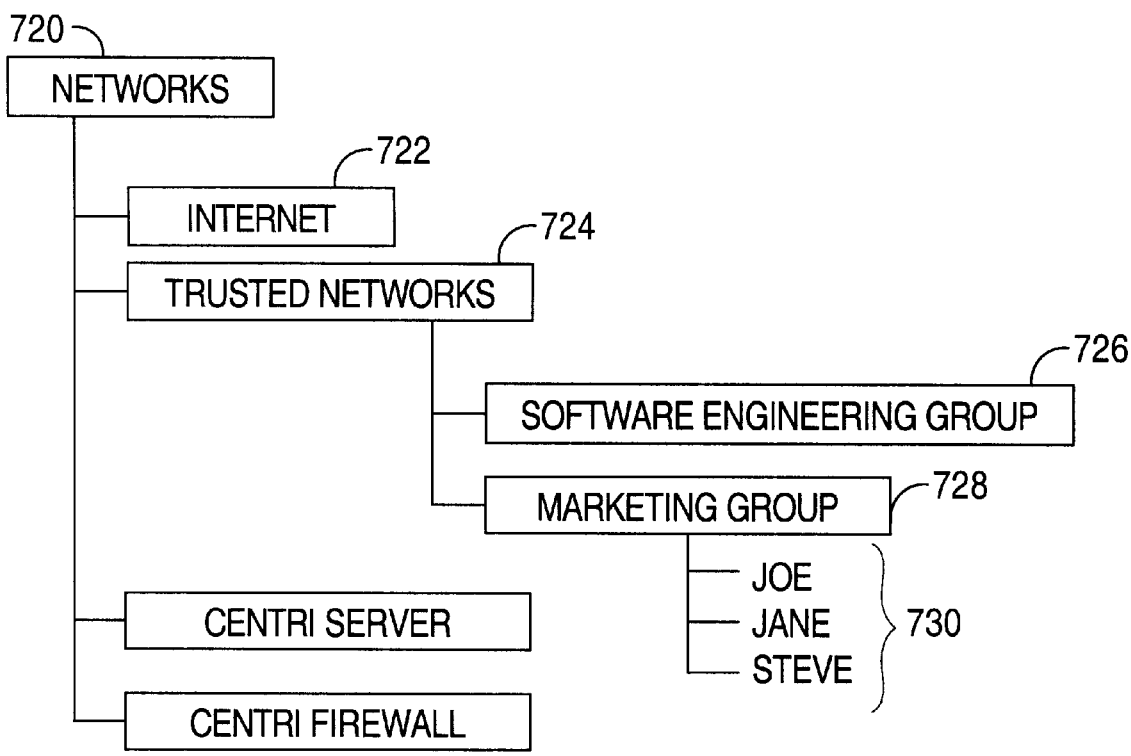
FIG. 7B is a diagram of a networks tree.

Overcoming the limitations of rule-based firewall architectures requires more than simply converting an ordered list of rules to a decision tree. Decision trees reflect only one aspect of the meaning contained in rule-based security policies. As shown in FIG. 7A and FIG. 7B, other aspects, including network protocols and network objects, are represented in the preferred embodiment as a Services tree 700 and a Networks tree 720. The Services tree 700 is useful to organize network protocols to represent user applications, which helps administrators to conceptualize the security policy being enforced. The representation of network objects in the Networks tree 720 and the way in which security policies are applied to those network objects can solve the primary problems involved in maintaining rule-based security policies.

REPRESENTING NETWORK PROTOCOLS

Using the Services tree 700, the administration component 206 allows administrators to organize their network services into meaningful bundles. The Services tree 700 provides two layers of abstraction that organize the detailed settings of network services, such as TCP, UDP, HTTP, and SMTP. The first layer of abstraction provides logical groupings for the network services that compose a user program. This abstraction layer is called Network Applications and is represented by the Network Applications node 702 of the Services tree 700.

The second abstraction layer is designed to organize software programs according to their common application within an organization. The second abstraction layer is called Bundled Applications and is represented by the Bundled Applications node 704 of the Services tree 700. It allows administrators to logically group the lower level network applications and network services into higher level bundles that reflect their users' common software needs.

Preferably, the Services tree 700 is stored in main memory of the computer system on which the present system runs. The Services tree 700, and information about the services that are stored in the leaf nodes of the Services tree, are defined by a network administrator and stored in a persistent storage device.

To simplify security policy development, administrators can define network applications and bundled applications and reference them in security policies. For example, in the Services tree 700, within the Network Applications node 702, a network administrator has defined leaf nodes that describe an HTTP service 710 and FTP service 712. Subsequently, the administrator may define a security policy that references the services 710, 712 and uses them as conditions within the policy. For example, the administrator prepares a policy in which the service associated with a data packet determines whether the packet is accepted or rejected. The services defined in the Network Applications node 702 may be referenced in any number of policies. Thus, the administrators can set up the services once and reference them in a security policy whenever they want to provide those network services for a particular network object.

In this context, the term "network service" refers to a descriptive wrapper for the actual configuration details of a network stack that satisfy an organization's requirements for a specific service. It organizes the administrator-defined settings and particular properties of the network protocols, and any required port mappings required by that service. For example, the Domain Name Server (DNS) Service 714 is well-defined at port 53 of the transport layer protocol TCP, which in turn requires the network layer protocol IP.

REPRESENTING NETWORK OBJECTS

One goal of the present system is to ensure that security policies match the administrators' vision of a security policy. A security policy is fully realized by attaching decision trees to network objects or to collections of network objects.

In the preferred embodiment, networks are based around the concept of a site. A site represents an administrative collection of individual computers, subnets, logical groups of computers and subnets, and other sites. A site has a well-defined network perimeter formed by a set of firewall servers that physically isolates the collection of computers and enforces the security policy for the site. Because more than one firewall can reside on a site, the same security policy can apply to multiple firewall servers, as well as any nested sites. All network objects, whether defined within a physical or logical network framework, are members of exactly one site. For example, as shown in FIG. 7B, a software engineering group identified by software engineering group object 726 and a marketing group identified by a marketing group object 728 are part of the trusted networks object 724.

Sites determine how security policies are applied, how networks are organized, and how network address translation works between two or more sites. How a network packet travels across two sites determines which security polices are applied. This traversal identifies the source and destination of the packet, thus identifying the point of origin as one site. Security policies that are applied to a particular site are enforced against all network packets that originate from that site.

The present system also allows administrators to group network objects and network services to support any organizational model that provides meaning to them. Just as administrators can group their network protocols into logical groups, they can represent and view their network from a physical layout perspective or a logical network perspective, whichever they prefer. As shown in FIG. 7B, the Networks tree 720 uses a tree structure in which leaf nodes can represent groups of users, such as a software engineering group 726 and a marketing group 728. The administrator may also define the individual hosts 730 that form each group. When defining new network objects, administrators can represent abstract concepts, such as entire networks, subnets, and individual hosts. Each of the groups 726, 728 and hosts 730 is a network object, in this context.

In the preferred embodiment, the Networks tree 720 is defined by an administrator before policy construction starts. Thereafter, administrators can reference the network objects in the Networks tree 720 when developing security policies. For example, the administrator can prepare a security policy that accepts or rejects a data packet depending on whether the destination of the packet is the software engineering group 726, the marketing group 728, or one of the hosts 730 within a group. Accordingly, the security policies are kept simple because, rather than incorporating the network-specific information, the security policies inherit knowledge about the network from the Networks tree 720. Further, a security policy may be attached to a group of objects rather than only to a single object. This inheritance is due to the fact that a firewall integrated with the present system enforces security policies on a per-site basis. In the case of nested sites, the appropriate security policies are enforced against network traffic that traverses multiple sites to reach its final destination.

Preferably, the network objects in the Networks tree 720 correspond to physical network objects within a physical installed network. Thus, the Networks tree 720 represents the topology of a physical network. Consequently, a firewall or gateway that uses the present system can automatically derive routing rules for logical network objects, and can identify where security policies should be applied by identifying where ranges of network objects exist. The protocols to be used by the firewall in evaluating network data packets are determined by the identity of the services to which the security policies are applied.

User Interface

General

The preferred embodiment provides an automated, graphical mechanism by which a human user such as a network administrator can establish network security policies that govern the operation of routers and other network devices. The user establishes a security policy by selecting icons or symbols that represent aspects of the policy, and arranging the icons in a graphical display using a flow-chart format. The policies are represented as graphical decision trees rather than as rule-based lists.

As a security policy is constructed using the icons, the mechanism concurrently creates and stores a script that expresses the security policy in the form of a simple procedural computer program. In the preferred embodiment, the script is prepared in a language called PolicyScript™, a policy language that is based on English. The script, and information describing the graphical display, are stored in association with a name of the policy.

Policies are constructed in memory during an editing session in which an administrator works with the graphical user interface. The administrator indicates that editing is complete by initiating a File Save command. In response, the policy and its associated script are saved in a database. An agent process that responds to the entry of the policy and script in the database, reads the script, and inserts a node in the decision tree that describes the policy and script. In the preferred embodiment, nodes of the decision tree contain commands for a firewall device expressed in bytecodes. The firewall device interprets the bytecodes in real time and converts the bytecodes into machine instructions. The instructions are executed with reference to data packets communicated in the network. By executing the instructions, the firewall enforces the security policies that have been symbolically defined by the user.

The administrator can define a security policy once and apply it to a plurality of network devices. To accomplish this, the administrator prepares a symbolic policy and saves it persistently using a unique name. The name of the policy and an icon representing the policy are displayed in a tree in a pane of a user interface generated by the mechanism. The physical network available to the administrator is displayed as a separate tree of icons that represent network objects. The administrator moves the mouse cursor to the previously defined policy, clicks and holds down a mouse button, and drags the icon representing the policy over an icon representing a network object. When the administrator releases the mouse button, the policy is applied to the network object. In this manner, policies can be dragged and applied to NT domains, users, groups, individual machines, or to arbitrary groups of machines residing in defined physical or logical networks.

Whenever a policy is edited, the policy structure is validated transparently to the user. The transparent validation is accomplished by selectively allowing or disallowing operations based upon the current context of a policy. For example, all edits to symbols within a policy are done from pop-up menus that are displayed selectively according to the context of the policy. The menus are displayed based upon what edits should be legal at any given stage in policy construction.

Figure 3:
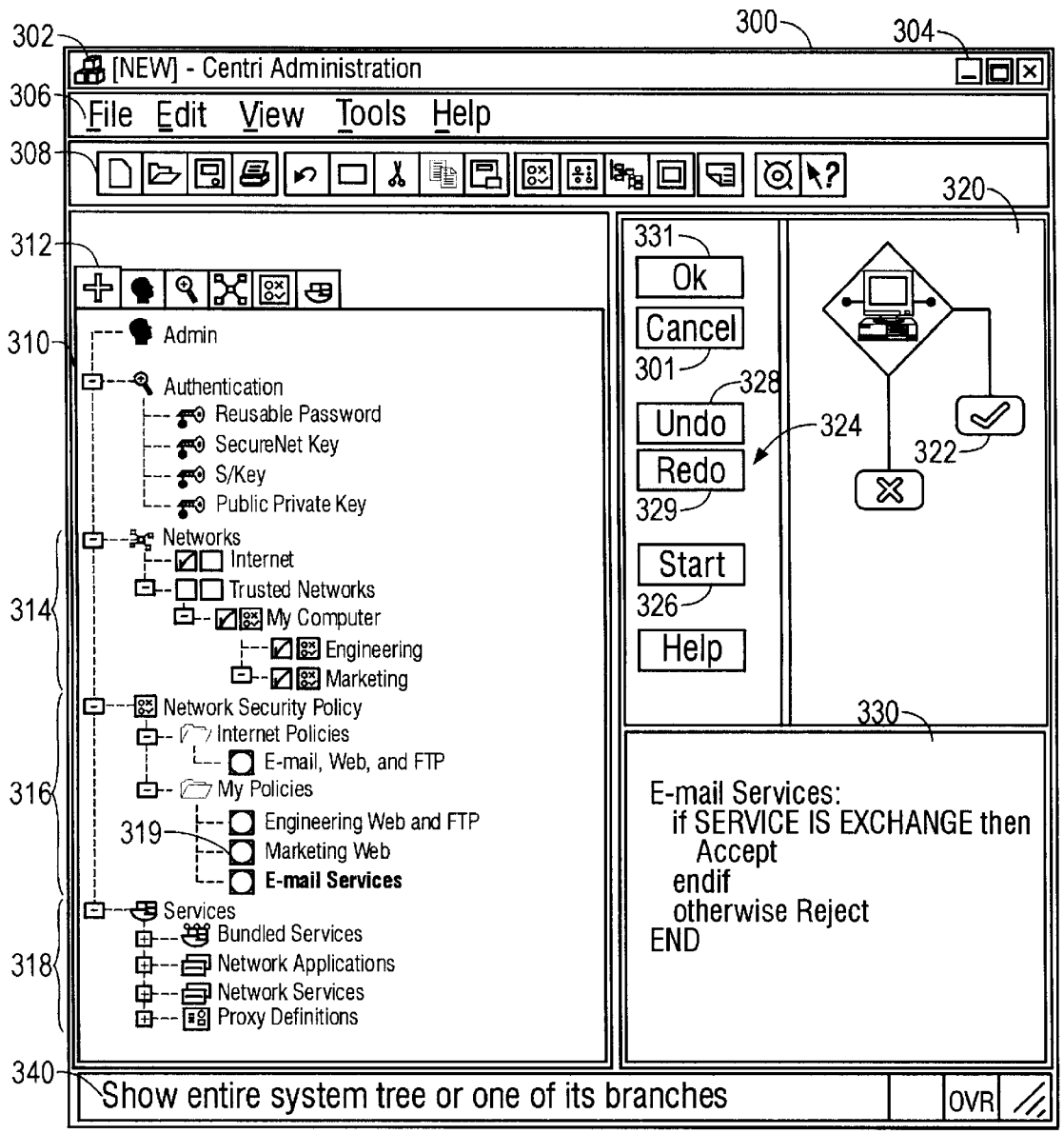
FIG. 3 is a diagram of an exemplary user interface display of an administration component of the system of FIG. 2.

FIG. 3 is a diagram of a user interface window 300. In the preferred embodiment, the administration component runs under control of the Windows NT operating system, and the administration component uses standard Windows NT window display functions to generate the window 300. Accordingly, the window 300 includes certain standard window elements such as a title bar 302 that displays the title of the administration component, and a set of buttons 304 that enable the user to minimize, maximize, or close the window 300.

A pull-down menu bar 306 is located immediately below the title bar 302. The pull-down menu bar 306 includes function keywords such as File, Edit, View, Tools, and Help that enable the user to access functions of the administration component. The functions available using the pull-down menu bar 306 are described further below. A function button bar 308 is located immediately below the pull-down menu bar 306. The function button bar 308 comprises a plurality of buttons that provide rapid access to functions of the administration component. Each of the buttons has a pictorial representation of its function. To activate a particular function, a user can select a button corresponding to the function, for example, by clicking on the button using a pointing device such as a mouse.

The window 300 further comprises a network viewer pane 310, a policy builder pane 320, and a policy script pane 330.

Network Viewer

It is possible to view a computer network in several different ways or from different conceptual viewpoints. For example, from one viewpoint, a network is one or more interconnected network devices. From another viewpoint, a network is one or more services. From still another viewpoint, a network is a collection of domains or users. Accordingly, the network viewer pane 310 provides a plurality of different views of a physical computer network. Each view is organized as a tree of related components.

For example, the network viewer pane 310 includes a network tree 314 showing the hierarchical relationship of each network that is physically available in the user's environment. In the example of FIG. 3, the network tree displays top-level nodes named "Internet" and "Trusted Networks." This indicates that the set of networks available to the current user includes the Internet and a plurality of more trusted networks. The trusted networks include Engineering and Marketing networks within the My Company network. To establish a security policy applicable to a network or one of its nodes, the user can drag network security policies and drop them onto each icon in the network tree 314. Preferably, the network tree 314 is a visual representation of the Networks tree 720 of FIG. 7B.

The network viewer pane 310 also has a policy tree 316. The policy tree 316 represents previously established security policies that are available to be applied to nodes of a network. In the example of FIG. 3, the policy tree 316 has top-level nodes named Internet Policies and My Policies. The Internet Policies include a policy named "E-mail, Web, and FTP." The name of this policy indicates that it establishes security rules for use of Internet e-mail, World Wide Web, and FTP services.

The network viewer pane 310 also has a services tree 318 that shows services available in the networks identified in the network tree 314. Examples of services include FTP and e-mail. Preferably, the services tree 318 is a visual representation of the Services tree 700 of FIG. 7A.

The administration component 206 provides mechanisms for constructing representations of abstract network security policies. After a security policy is constructed, it is represented in the policy tree 316 as a named policy. The security policy is applied to a node of the network tree 314 by dragging the icon representing the policy from the policy tree 316 to the node in the network tree 314. When the network tree 314 is saved, the administration component 206 constructs instructions to the firewall that cause the firewall to enforce the security policies that have been defined.

GRAPHICAL POLICY CONSTRUCTION

Network security policies are constructed using the policy builder pane 320 and the buttons 324 under control of instructions that form part of the administration component 206. The user constructs a security policy by arranging one or more icons 322 into a representation of the policy in the policy builder pane 320.

As the security policy is constructed, the administration component 206 generates a source script that defines the policy in a scripting language, and displays the script in the script pane 330. The script in the script pane 330 is dynamically updated as the user edits and changes the security policy shown in the policy builder pane 320. Also, when the user moves the cursor to point at one of the icons 322 (for example, using a pointing device such as a mouse), the administration component 206 highlights a portion of the script that corresponds to the position of the cursor. The highlighting is dynamically updated as the cursor is moved. This enables a user who is not a programmer to rapidly associate policy symbols with policy script statements. In one embodiment, the highlighting is accomplished by displaying the highlighted portion in a font color different from the portion of the script that does not correspond to the icon that is being pointed to.

Preferably, the script in the script pane 330 is always generated by the administration component 206 as a policy is graphically constructed. It is considered undesirable to allow an administrator to directly prepare or edit a script, because syntactic checking and error reporting would be required. In the preferred embodiment, syntactic correctness of the script is ensured by requiring the user to work with symbols and symbol manipulation functions that are controlled in a context-sensitive way.

Figure 4A:
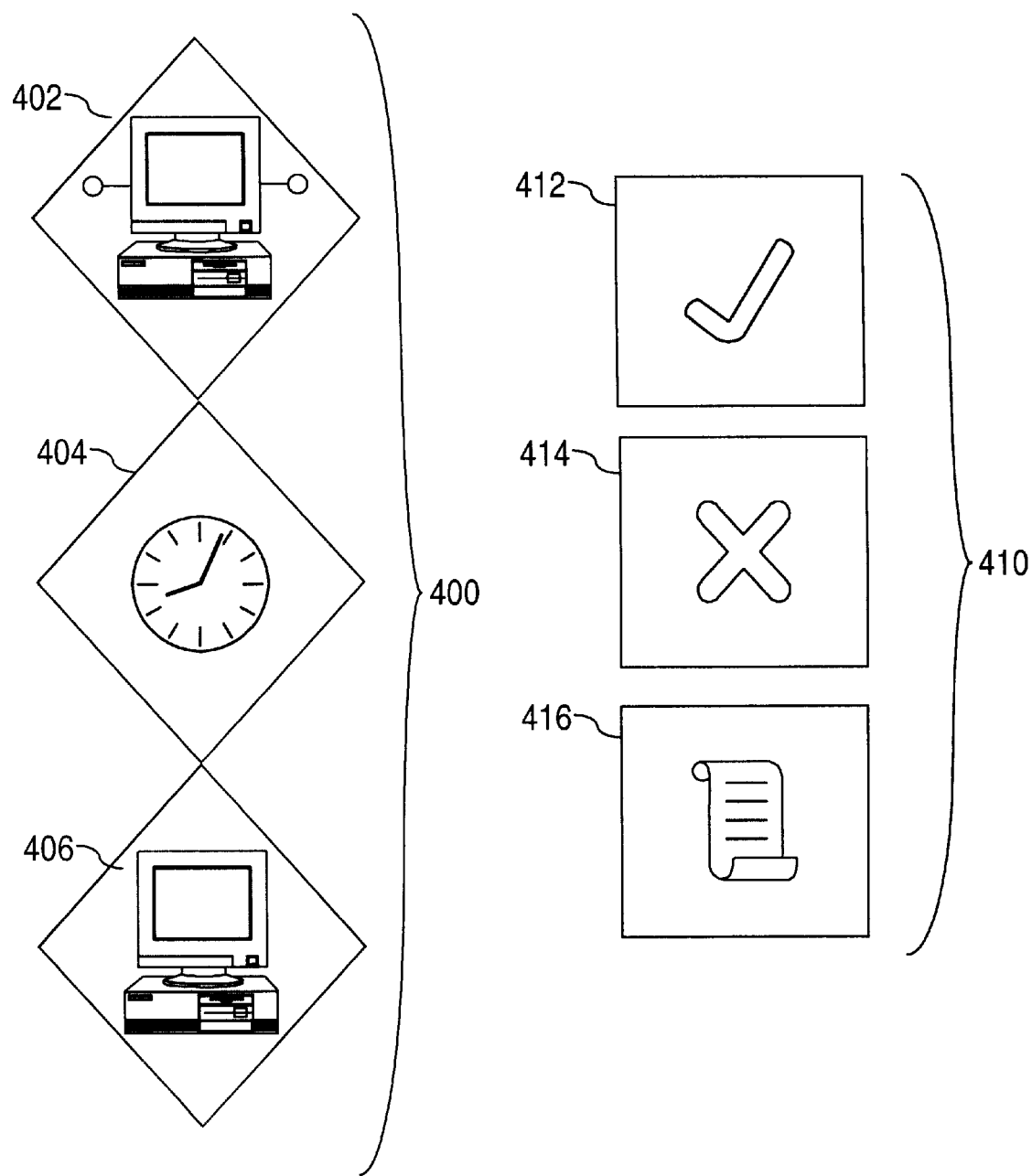
FIG. 4A is a diagram of condition symbols and action symbols.

FIG. 4A is a diagram of symbols that are displayed by the administration component 206 and that can be manipulated by a user to construct a network security policy. The symbols comprise three condition symbols 400 and three action symbols 410.

The condition symbols 400 are represented using diamond-shaped icons, and comprise a service condition symbol 402, a time range symbol 404, and a destination symbol 406. The service condition symbol 402 represents one of the services in the services tree 318. It is used to construct security policies that accept or reject data packets relating to the service identified by the symbol. The time range symbol 404 represents a span of hours. The time range symbol 404 is used to construct security policies in which data packets are to be accepted or rejected based upon the time of day when they arrive or are sent. The destination symbol 406 represents an end point at which data packets are directed. The destination symbol 406 is used to establish security policies in which a data packet is accepted or rejected based upon the intended destination of the data packet. In alternate embodiments, other condition symbols are provided.

The action symbols 410 comprise an Accept symbol 412, a Reject symbol 414, and a Use Next Policy symbol 416. The Accept symbol 412 indicates that a data packet is to be accepted by the firewall when the logical position of the accept symbol is reached as the security policy is processed. The Reject symbol 414 indicates that a data packet is to be rejected at that point. The Use Next Policy symbol 416 indicates that control is to be passed to the next policy in the set of policies reflected in the network tree.

In the decision tree-based security model, the action symbols represent explicit terminal nodes in the tree. In this context, "action" refers to a component of a security policy that resolves a condition. It is a terminal node in a condition branch. The firewall enforces a specific action against any session requests that satisfy the condition branch leading to that action. The accept and reject symbols represent terminal nodes that conclude the evaluation process. A condition evaluates a session request to determine whether that session satisfies the constraints specified by the administrator. If that condition is terminated using actions, the actions determine whether to accept or reject the session.

The Use Next Policy symbol 416 differs from the other two actions because it does not signal the end of the evaluation process. When control is passed to the next policy using the Use Next Policy symbol 416, the firewall has determined explicitly that the current security policy does not have the condition branches appropriate to evaluate the session request, so control is passed to the next available security policy for further processing. Thus, the administrator can easily make exceptions to a security policy.

In this context, "terminal nodes" are nodes with no children, also referred to as leaves.

To initiate creation of a policy, a user or administrator selects the Start button 326. In response, the administration component 206 creates information structures relating to a new policy, clears the policy builder pane 320, and displays a single Reject symbol 414. The administrator then constructs a policy by adding and changing symbols that represent the policy logic. To remove a symbol, the administrator selects the Undo button 328. In response, the administration component 206 removes the most recently added symbol from the policy. To restore that symbol to the policy, the administrator selects the Redo button 329.

When the policy is complete, the administrator selects the OK button 331 to save the policy. In response, the administration component 206 displays a dialog that prompts the administrator to enter a descriptive name for the policy. The administrator may select the Cancel button 301 to remove all symbols from the policy and restore the policy builder pane 320 to its original state in which one Reject symbol is displayed.

How Conditions Are Structured

Figure 5:
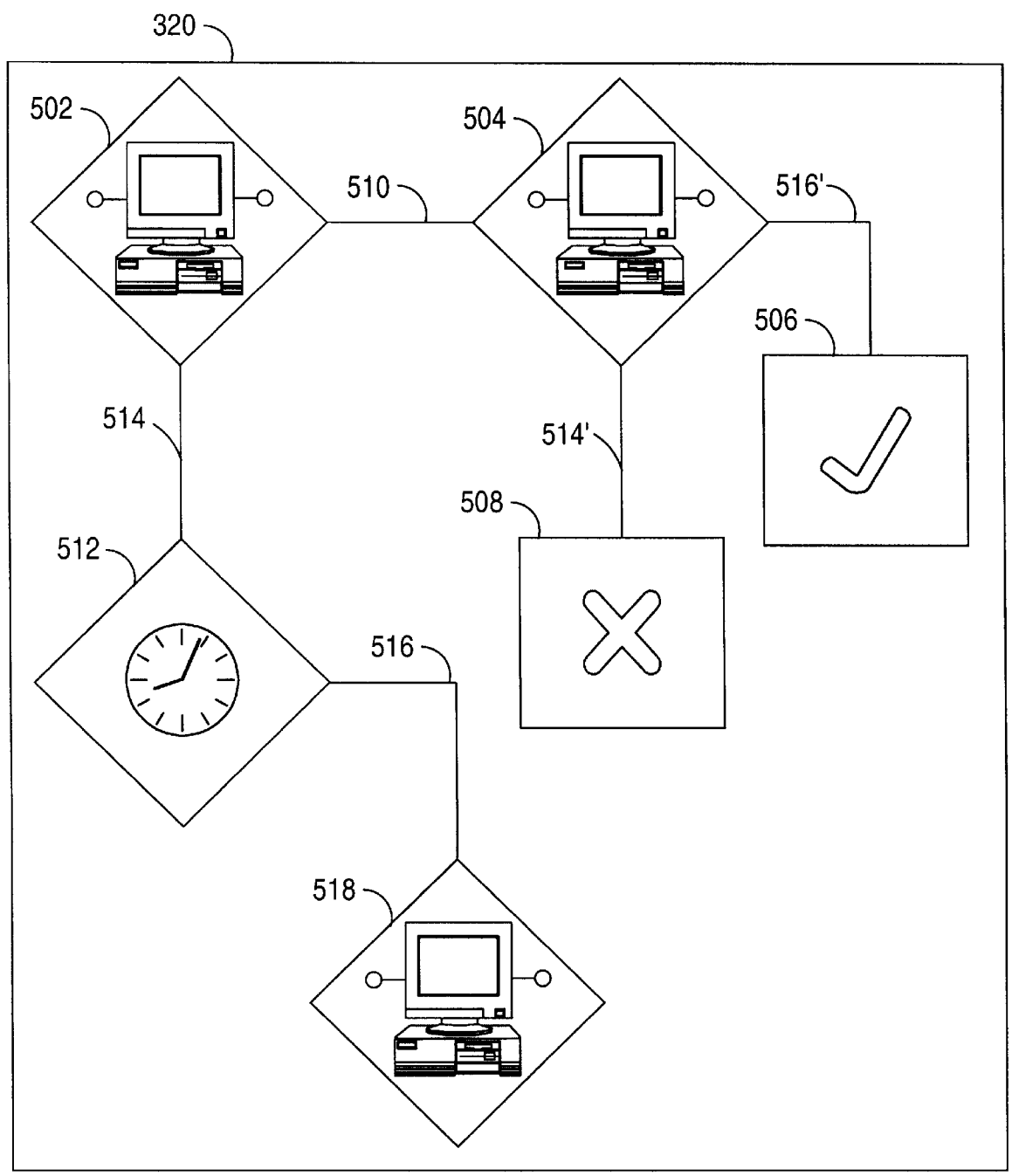
FIG. 5 is a diagram showing an example of a symbolic network security policy.

The combination of a condition and two terminal nodes represents a statement. Statements are logical structures that can be combined to provide nested evaluations. An English-like policy scripting language is used as an intermediate form of representing security policies. The following grammar specification defines the structure of statements and conditions in the decision trees and in the scripting language.

condition statement: IF<condition>THEN<statement A> OTHERWISE<statement B>
statement: conditional statement|terminal node
terminal node: ACCEPT|REJECT|Use Next Policy
condition clause: <destination>IS <constant>
|<service>IS<constant>
|<time range>IS<constant>
condition: condition clause|condition clause OR condition A simple condition statement evaluates a session request against a single condition. In such statements, an action is always taken against the session request, regardless of the evaluation's outcome. In the simplest condition statement, the action is Accept or Reject. An example of a simple condition statement is, "If Destination Is 192.168.1.10 THEN Accept OTHERWISE Use Next Policy." Examples of simple condition branches, which are described further elsewhere in this document, are shown in FIG. 5, symbols 504, 506, and 508, and FIG. 6, symbols 614, 616, 618.

A complex condition statement evaluates a session request against two or more conditions that are linked using either a nested IF or an OR conjunction. Complex condition statements allow you to evaluate a session request against multiple conditions.

A nested IF construct connects two or more conditions, and it is equivalent to a logical AND operation. To satisfy a nested IF construct, the session request must satisfy all of the conditions (all conditions must be true) in the nested IF statement.

A nested IF construct has the following structure:
IF<condition 1>THEN

. . .

IF . . . <condition N>THEN<statement>
   OTHERWISE<statement>

Figure 6:
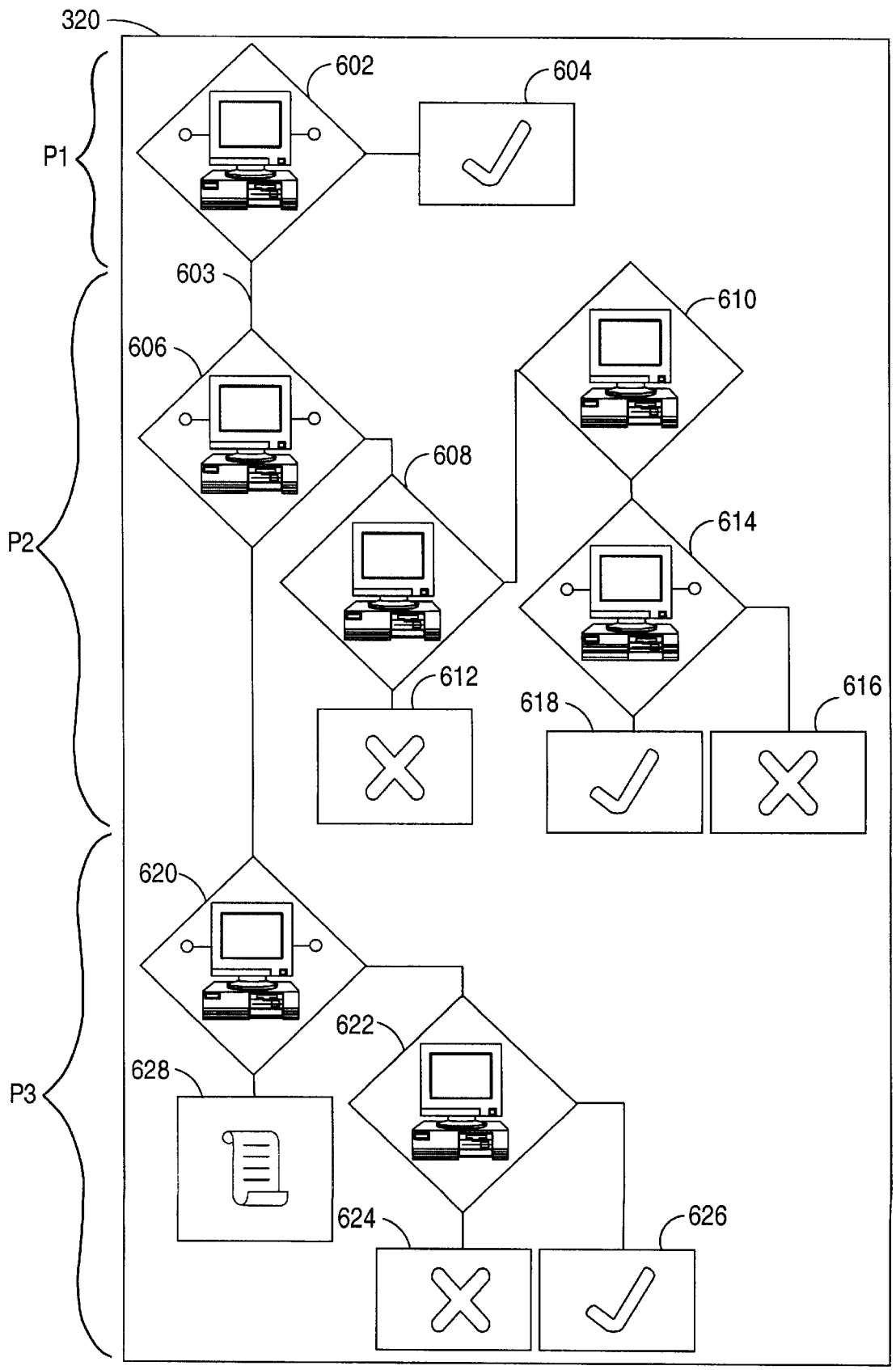
FIG. 6 is a diagram showing another example of a symbolic network security policy.

A specific example of a nested IF construct is:
If Service Is HTTP THEN
   If Destination Is WEB SERVER FARM THEN
      Accept
   OTHERWISE Reject
OTHERWISE Use Next Policy An example of a nested IF construct is shown in FIG. 6, symbols 620–628, inclusive.

An OR construct connects two or more conditions. If the session request satisfies any of these conditions (only one must be true), then the evaluation of the condition continues with<statement A>. An OR construct has the following structure:

IF<condition 1>OR . . . <condition N>THEN
   <statement>
OTHERWISE<statement>

An example of an OR construct is shown in FIG. 5, symbols 502–508, inclusive.

In certain embodiments, the system also enables invocation of previously defined policies by name, using the following logical structure:

IF<condition 1>THEN
   USE<Named Policy>
OTHERWISE USE<Named Policy>

Editing A Security Policy

To establish a new security policy, a user selects the Start button 326, for example, by moving the cursor to the Start button with a mouse and clicking on a button of the mouse. In response, the administration component 206 displays a single Reject symbol 414 in the policy builder pane 320. This responsive action reflects an operational theme of the administration component 206, namely, that the default behavior of the administration component is to reject all data unless it is expressly allowed by user action.

Figure 4B:
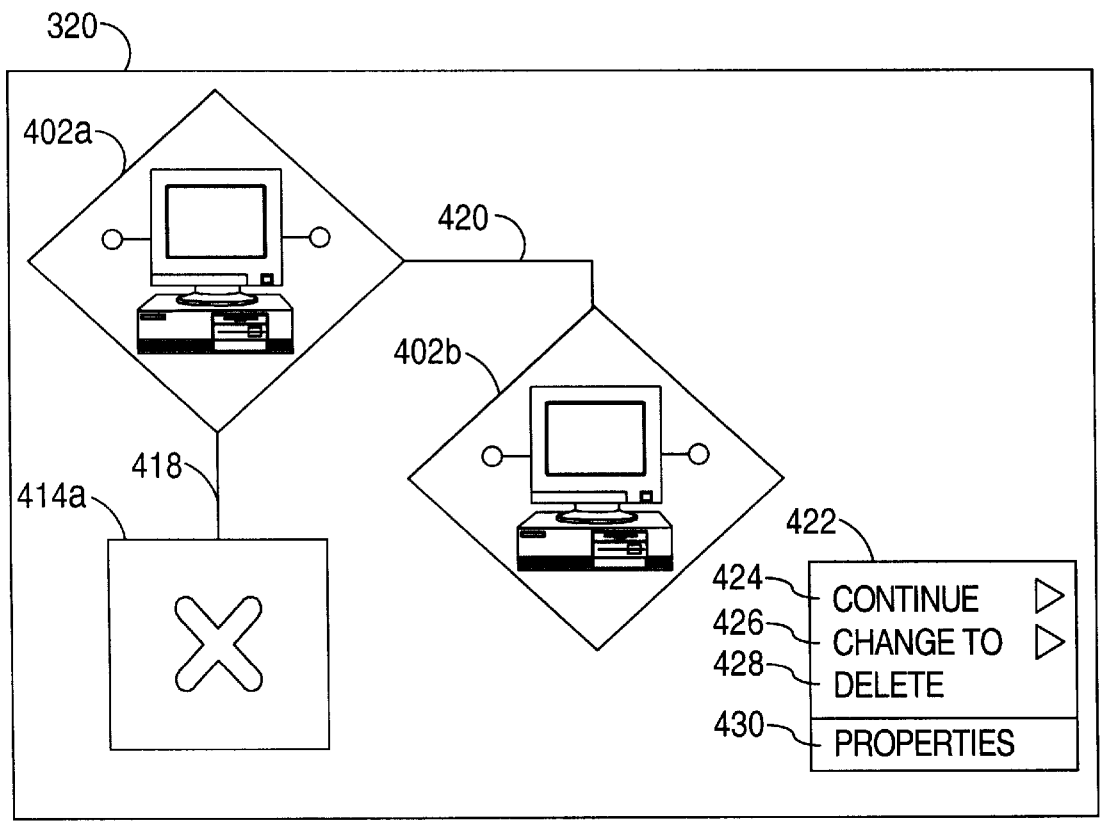
FIG. 4B is a diagram showing an example of policy editing using a change menu.

To continue establishing the new security policy, the user selects one of the symbols displayed in the policy builder pane 320 and modifies the properties of the symbol. FIG. 4B is a diagram showing an example of policy editing using a change menu. In the example of FIG. 4B, the user has established a security policy in the policy builder pane 320 comprising a first service condition symbol 402a, a second service condition symbol 402b, and a Reject symbol 414a. These symbols reflect a security policy that means "If service (a), then if service (b), otherwise reject." The action to take if service (b) exists is not yet defined.

The structure of the symbols displayed in the policy builder pane 320 reflects certain rules followed by the administration component 206 to enforce policy consistency and reliability. For example, all security policies must terminate in one of the action symbols 410, and all security policies must have at least one Reject symbol 414. A straight, vertical line 418 connects each condition symbol to the next symbol to be evaluated when the condition symbol yields a negative or false result. In contrast, an angled line 420 connects each condition symbol to the next symbol to be evaluated when the condition symbol yields a positive or true result. This rule facilitates readability of the security policy, since all negative or false paths are rapidly followed downward whereas positive or true paths branch outward to the right.

When a currently displayed symbol of a policy is clicked with the right mouse button, the administration component 206 displays a pop-up menu that presents choices that are then currently available for changing the symbol's associated data, for changing the symbol type, or for extending policy logic from the symbol. Commands allowable in a given context are enabled on the menu and displayed in normal tones. Commands that are unavailable or invalid in the current context are disabled and displayed in grayed-out tones. FIG. 4B shows a pop-up menu 422 that is displayed in response to the user moving the cursor to the second service condition symbol 402*b* and pressing the right mouse button. The pop-up menu 422 has four available options or commands, namely a Continue command 424, a Change To command 426, a Delete command 428, and a Properties command 430.

Continue Command

The Continue command 424 is used to extend security policy logic from the currently selected symbol. The Continue command 424 is enabled or available in the pop-up menu 422 only when logical extensions to the current symbol are allowable. Policy logic can be extended only from the three condition symbols 400. Policy logic cannot be extended from the three action symbols 410.

Figure 4C:
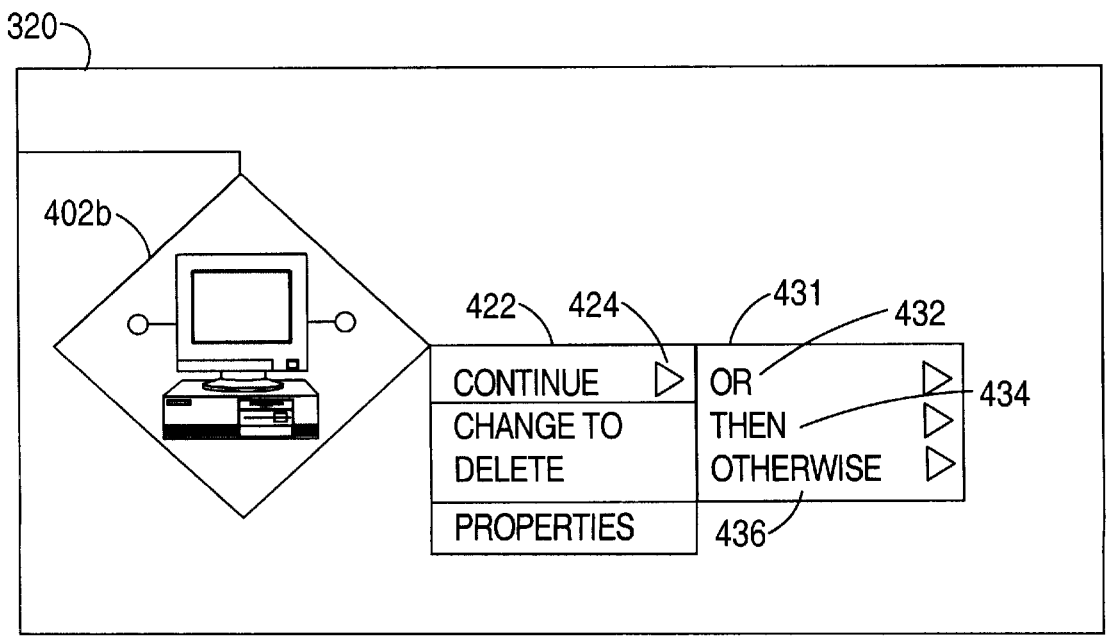
FIG. 4C is a diagram showing an example of policy editing using a CONTINUE command.

When the Continue command 424 is selected, the administration component 206 displays a pull-down menu 431 of extension commands, as shown in FIG. 4C. The extension commands comprise an OR command 432, a THEN command 434, and an OTHERWISE command 436. The OR, THEN, and OTHERWISE commands express logical conditions that can be used to join a condition symbol to another symbol.

The OR command 432 is always available for any condition symbol. Preferably, the OR command is used to add additional conditions only of the same type as a prior symbol, so that a policy expresses a compound statement such as:

If Service is FTP OR if Service is HTTP then . . . .

Alternatively, the OR command is used to add conditions of a different type to a policy, so that the policy expresses a compound statement such as:

If Time Range is 9–5 pm OR if Service is FTP then . . . .

However, this alternative is less preferred, because it increases the chance that the user will construct an illogical policy statement.

Figure 4D:
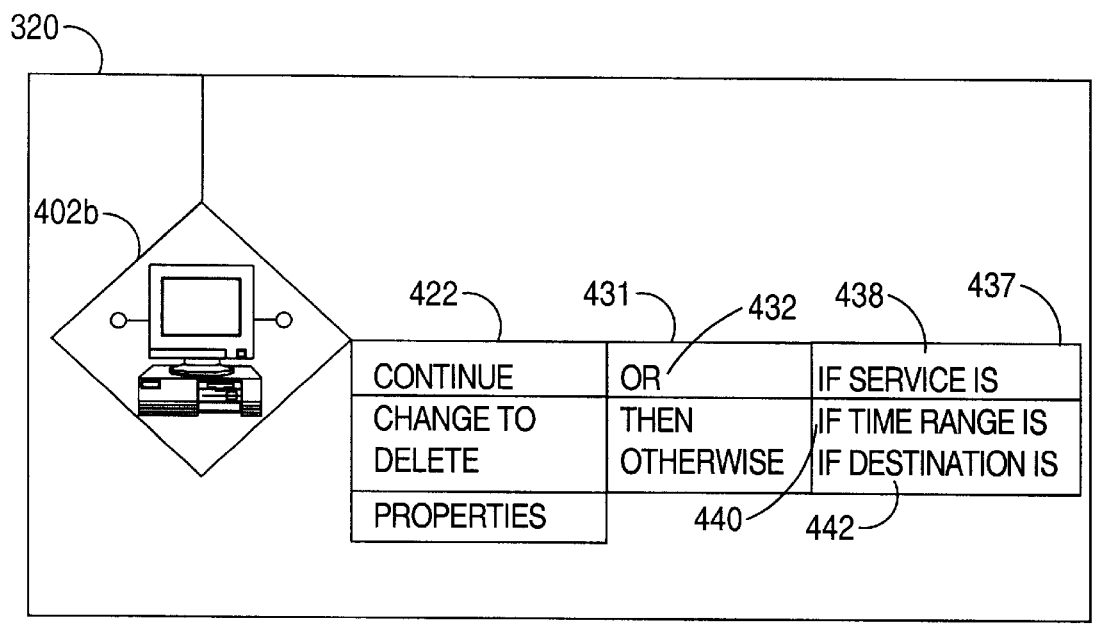
FIG. 4D is a diagram showing an example of policy editing using an OR command.

When the OR command 432 is available and is selected by the user, the administration component 206 displays a second sub-menu 437 of OR extension commands, as shown in FIG. 4D. The second sub-menu 437 has an "If Service is . . ." command 438, an "If Time Range is . . ." command 440, and an "If Destination is . . ." command 442. Only one command in the second sub-menu 437, that is valid in the current context, is displayed in a normal typeface; unavailable commands are displayed so as to indicate that they are unavailable, for example, in grayed-out form. The available command corresponds to the type of condition symbol that is being extended. For example, when the second sub-menu 437 is used to extend logic relating to a service condition symbol such as symbol 402*b*, the one valid and available command is the "If Service is . . ." command 438. The other two commands are disabled and unavailable. The process of selectively making commands available, depending on the current context, assists the user in constructing logically valid statements.

When one of the commands 438, 440, 442 is selected, in response, the administration component creates a new condition symbol and displays the new symbol in the policy builder pane 320 at a position adjacent to the symbol that is being extended, linked with a horizontal line. An example of a graphical representation of an extended policy in a policy builder pane 320 is shown in FIG. 5. The policy begins at a first service condition symbol 502. When the first service condition symbol 502 is extended using the Continue command 424, OR command 432, and "If Service Is . . . " command 438, the administration component creates a second condition symbol 504. The second condition symbol 504 is displayed to the right of the first service condition symbol 502, joined to it by a horizontal line 510. The horizontal line 510 symbolically represents the logical OR path.

Concurrently, the administration component 206 amends the script that is currently displayed in the script pane 330 by adding statements or keywords that reflect the policy logic represented by the symbols in the policy builder pane 320.

Figure 4E:
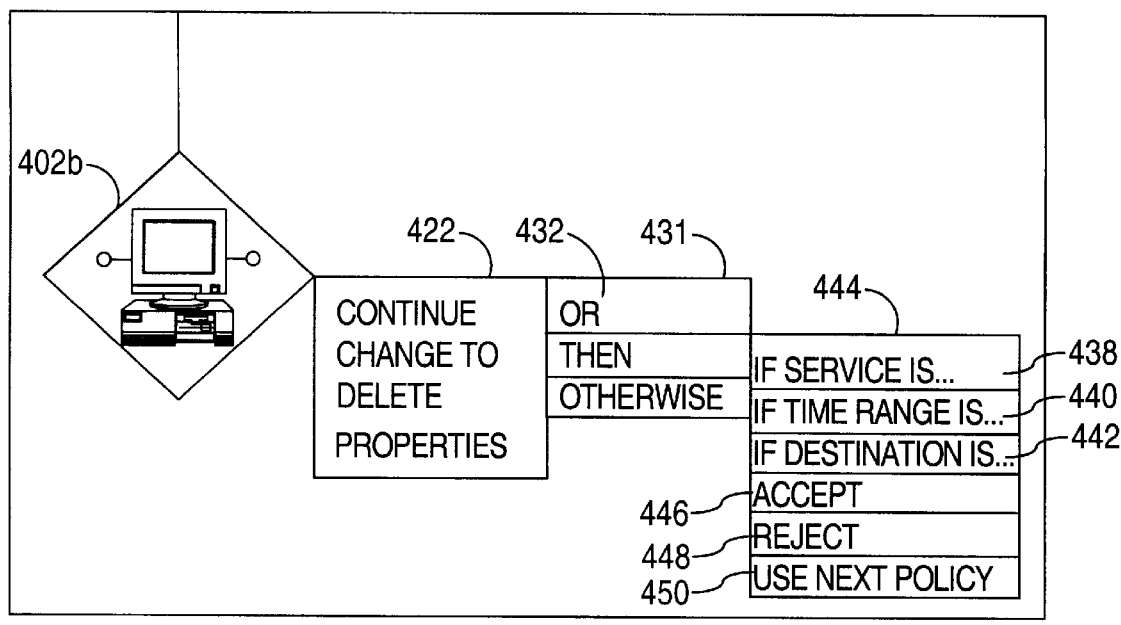
FIG. 4E is a diagram showing an example of policy editing using a THEN command.

When the THEN command 434 is selected, a third sub-menu 444 of extension commands is displayed, as shown in FIG. 4E. The third sub-menu 444 enables the user to express logical actions for the true case of a selected condition symbol. The third sub-menu 444 has an "If Service Is . . ." command 438, an "If Time Range Is . . . " command 440, and an "If Destination Is . . . " command 442 as does the second sub-menu 437. The commands 438, 440, 442 operate in a manner similar to that described above in connection with the OR command 432, except that the second symbol is joined to the first symbol using an angled line. As shown in FIG. 5, a time of day condition symbol 512 has been extended using a third service condition symbol 518. The third service condition symbol 518 is joined to the time of day condition symbol 512 using an angled line 516. The angled line 516 symbolically represents the logical THEN path. Thus, in combination the symbols 512, 518 and the line 516 reflect the policy logic, If Time Of Day Is<range of hours>THEN If Service Is . . . .

The third sub-menu 444 also has an Accept command 446, a Reject command 448, and a Use Next Policy command 450. Selecting these commands respectively causes the administration component 206 to create a new Accept symbol 412, Reject symbol 414, or Use Next Policy symbol 416. The symbol that is created is linked to the current symbol using an angled line to indicate a THEN logical relationship. For example, in FIG. 5, the second service symbol 504 has been extended using the CONTINUE, OR, and ACCEPT commands. An accept symbol 506 is linked to the second service symbol using an angled line 516'. Thus, symbols 504, 506 and the angled line 516' represent the policy logic, If Service Is<name of service>THEN Accept The THEN command 434 is available for a condition symbol only if the condition symbol does not currently have a THEN relationship defined. For example, referring to FIG. 5, for the third service symbol 518, the THEN command would be valid and available in the second pull-down menu 431, because the third service symbol 518 does not currently have a THEN relationship defined for it. In contrast, for the second service symbol 504, the THEN command would be invalid and unavailable in the second pull-down menu 431 because a THEN condition has already been defined for the second service symbol 504, as indicated by the angled line 516'.

In addition, the ACCEPT command 446 is disabled and unavailable in the third sub-menu 444 when the currently selected condition symbol is not a service condition symbol 402, and no service condition symbol is a direct ancestor of the currently selected condition symbol. In this context, a "direct ancestor" is a previously defined symbol that is hierarchically above the current symbol, for example, above or to the left of the current symbol in the graphic representation of the policy builder pane 320. For example, in FIG. 5, the direct ancestors of the third service condition symbol 518 are the time of day condition symbol 512 and the first service condition symbol 502, but not the second service condition symbol 504. The foregoing rule is enforced to ensure that data packets are not accepted exclusively based upon time of day or destination conditions; the user must consider the service represented by a data packet in establishing a policy that results in acceptance of the packet.

Figure 4F:
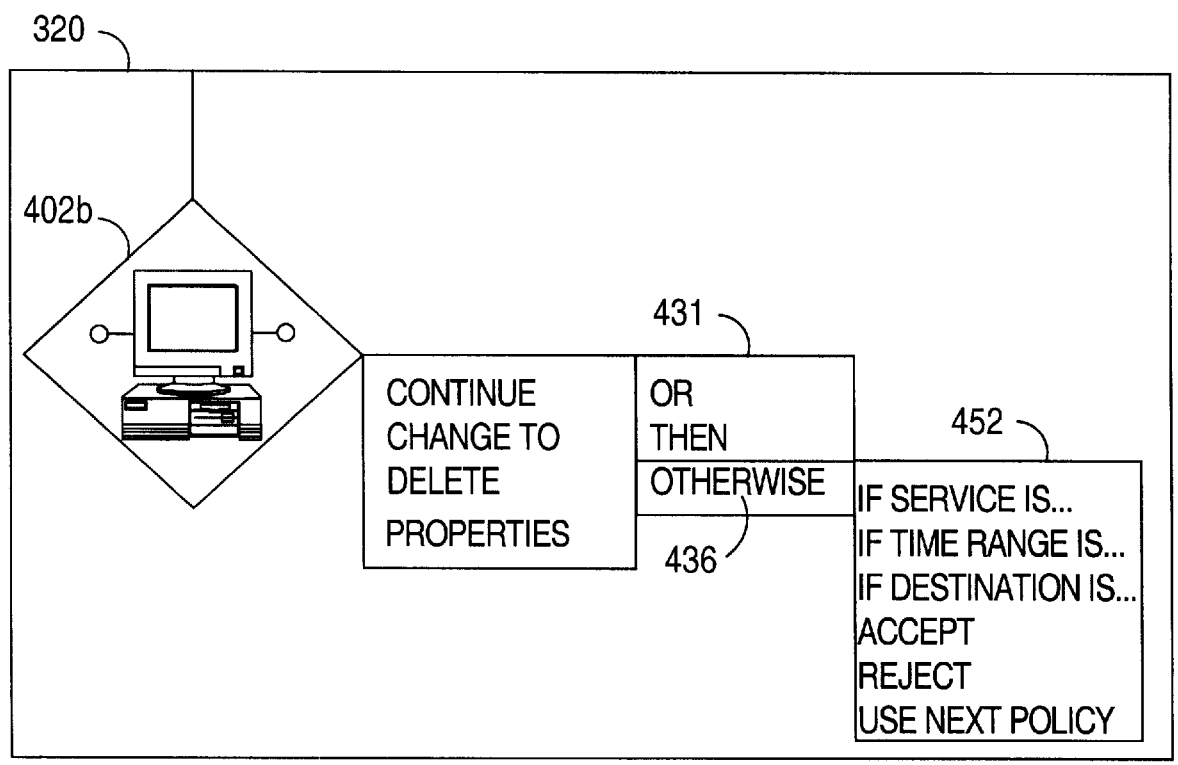
FIG. 4F is a diagram showing an example of policy editing using an OTHERWISE command.

When the OTHERWISE command 436 is selected from the second pull-down menu 431, the administration component displays a fourth pull-down menu 452, as shown in FIG. 4F. The fourth pull-down menu 452 has the same commands 438, 440, 442, 446, 448, 450 that comprise the third sub-menu 444. The OTHERWISE command 436 and the fourth pull-down menu 452 enable the user to establish logic that is carried out when a selected condition symbol evaluates to a FALSE condition. An example of policy logic involving an OTHERWISE case is:

If Service is Telnet then Accept OTHERWISE Reject

When the user selects one of the commands 438, 440, 442, 446, 448, 450 using the third pull-down menu 444, the administration component 206 creates a new symbol corresponding to the command that is selected. The new symbol is displayed directly below the currently selected symbol, and is linked to the currently selected symbol by a vertical line. For example, referring to FIG. 5, if the user selects the second service condition symbol 504 and selects the CONTINUE, OTHERWISE, and REJECT commands, the administration component 206 displays a reject symbol 508 directly below the second service condition symbol, and links the symbols using a vertical line 514'. Thus, in combination, the symbols 504, 508 and the vertical line 514' represent the policy logic:

If Service Is<name of service>... OTHERWISE Reject

The OTHERWISE command 436 is available for a condition symbol only if no OTHERWISE logic has already been established. For example, referring to FIG. 5, if the user selects the time of day condition symbol 512 as the current symbol, the OTHERWISE command 436 is available in the second pull-down menu 431, because there is no OTHERWISE logic established for the symbol. In contrast, if the user selects the second service condition symbol 504 as the current symbol, the OTHERWISE command 436 is unavailable in the second pull-down menu 431, because an OTHERWISE logic path has been established to the REJECT symbol 508.

Change To Command

Using the Change To command, a user can change a policy symbol from one type to a different type. For example, an Accept symbol 412 can be changed to a Reject symbol 414.

Figure 4G:
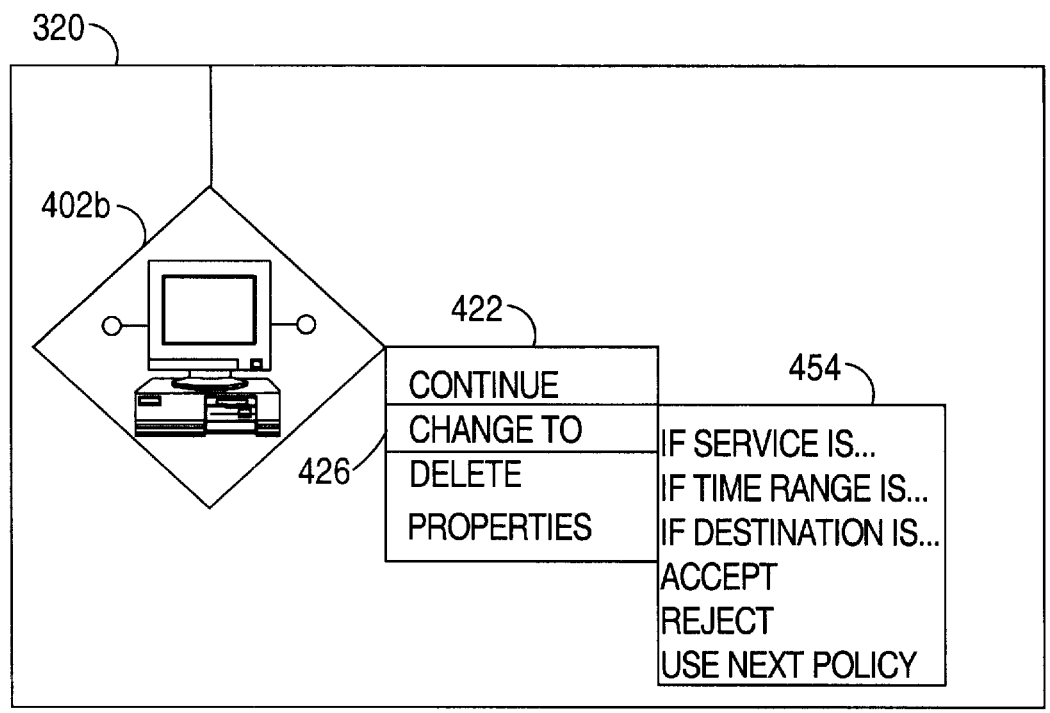
FIG. 4G is a diagram showing an example of policy editing using a CHANGE TO command.

FIG. 4G is a diagram of a policy builder pane 320 when the Change To command 426 is selected for a current symbol, such as the service condition symbol 402b. When a user selects the Change To command 426 from the first pop-up menu 422, the administration component 206 displays a Change To pull-down menu 454 that contains a list of names of available commands. The commands available in the Change To pull-down menu 454 are the same as those available in pull-down menu 452, namely an "If Service Is . . . " command, an "If Time Range Is . . . " command, an "If Destination Is . . . " command, an "Accept" command, a "Reject" command, and a "Use Next Policy" command.

The operation of these commands is governed by rules that are applicable only in the context of the Change To command 426. For example, when the current symbol selected by the user is one of the condition symbols 400, the Change To command 426 can be used only to change the current symbol to one of the other condition symbols. The "Accept," "Reject," and "Use Next Policy" commands are unavailable and are displayed in a manner to indicate that they are unavailable; for example, they are displayed in half-intensity characters.

Another rule governing use of the Change To command 426 is that if the currently selected symbol is the only symbol in the policy, the symbol cannot be changed to an Accept symbol 412. This prevents the user from establishing a policy in which all data packets are accepted, which is considered undesirable. Yet another rule governing use of the Change To command 426 is that no symbol can be changed to an Accept symbol 412 unless it is preceded in the policy hierarchy by a service condition. This rule also prevents the user from establishing a policy in which data packets are accepted without consideration of the service to which the packets relate.

Still another rule governing use of the Change To command 426 is that a service condition symbol cannot be changed to an action symbol if the service condition symbol is followed by an Accept symbol 412. To change a service condition in that case, the user must first change the Accept symbol 412 to another symbol.

When a valid Change To command is carried out, the administration component 206 modifies the script that is displayed in the script pane 330 to match the symbol change effected by the user.

Delete Command

The Delete command 428 enables a user to delete a symbol from a policy and concurrently delete corresponding script statements from a policy script. The Delete command 428 is enabled for all of the condition symbols 400 and action symbols 410 that may exist in a policy, except the first symbol in a policy. The first symbol cannot be deleted. This prevents the user from establishing a policy that is null.

If the symbol to be deleted is one of the condition symbols 400, then any symbols that are attached to the symbol by THEN or OTHERWISE relationships are also deleted. If the condition symbol has no other symbols attached to it or extended from it, or if the symbol is one of the action symbols 410, then only the symbol itself is deleted. Concurrently, the administration component deletes corresponding statements and keywords in the script that is currently displayed in the script pane.

Properties Command

The Properties command 430 enables the user to explicitly set properties of a condition symbol by checking boxes in a pop-up menu. The Properties command 430 is available in the pop-up menu 422 only when the currently selected symbol is a condition symbol, such as the second condition symbol 402b shown in FIG. 4B. If the user selects one of the action symbols 410, the Properties command 430 is unavailable and is displayed in the pop-up menu 422 so as to indicate that it is unavailable, for example, in half-intensity characters.

Alternatively, the Properties command 430 is invoked when the user double-clicks a mouse button while pointing at a symbol. In another alternative, to invoke the Properties command 430 the user selects a symbol by clicking on it once using the mouse, and then presses the ENTER key on the computer keyboard. In these alternatives, in response the administration component 206 displays an editing pop-up menu. The Properties pop-up menus are described in the next section below.

Property Dialogs

Preferably, administration component 206 displays a dialog or pop-up menu automatically when a condition symbol is first added to a policy. A dialog associated with the pop-up menu must be completed with valid data and the user must press an OK button in order for the new symbol to be accepted as part of the policy. If the Cancel button is pressed, or the dialog is dismissed in any other way, then the new condition symbol that was being added will be removed from the policy. The policy builder pane 320 is redrawn so as to depict the original policy before the attempt to add the symbol was made.

Figure 8A:
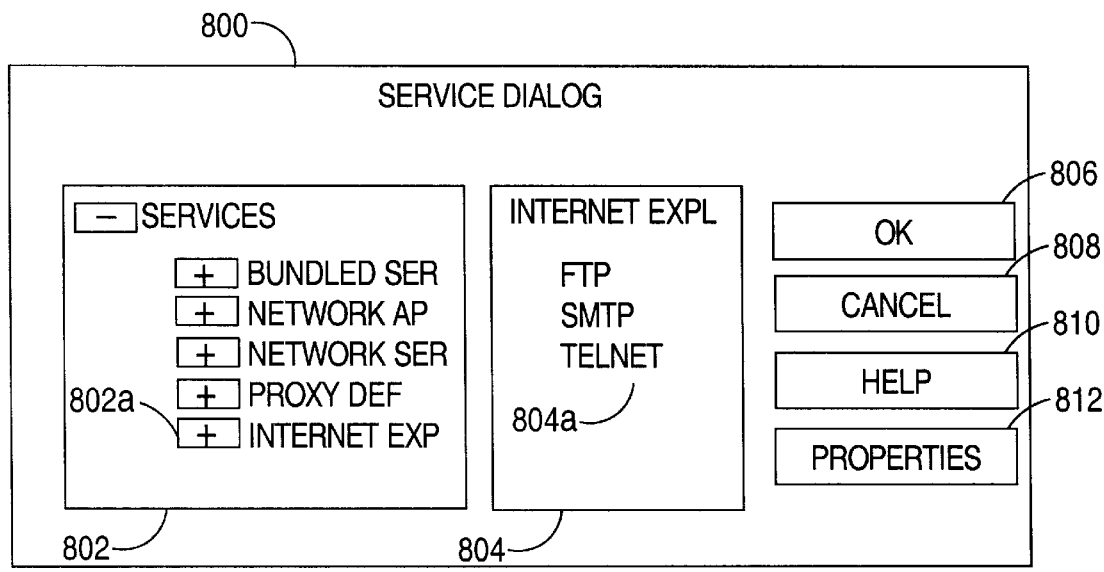
FIG. 8A is a diagram of a services dialog.

When the symbol is a service condition symbol 402, the administration component 206 displays the Service Dialog 800 shown in FIG. 8A. The Service Dialog comprises a service selection list 802, a results pane 804, an OK button 806, Cancel button 808, and Help button 810. The OK button 806, Cancel button 808, and Help button 810 are standard features of the preferred Windows NT ® user interface so that a detailed description of their functions is not necessary in this document. Selecting the OK button 806 causes the information entered in the dialog 800 to be saved by the administration component 206 and used in subsequent processing. The Service Dialog 800 also has a Properties button 812.

The service selection list 802 presents a copy of the Services tree 318 from the network viewer pane 310 shown in FIG. 3. Thus, the service selection list 802 displays all currently defined service types, such as FTP, Telnet, etc., as well as all currently defined service groups (such as Internet Explorer, which contains several implied services). To select a service for use in the current condition symbol, the user clicks on a service listed in the service selection list 802, and the corresponding service (or list of implied services for the selection) appears in the results pane 804.

For example, as shown in FIG. 8A, the service selection list 802 lists various services including an Internet Explorer service 802a. The user clicks on the Internet Explorer service 802a, and that service and its implied services 804a are listed in the results pane 804. When the user clicks the OK button 806, the selected services are applied to the current condition symbol. Thus, the results pane 804 indicates what services the condition will reference. If, for instance just Telnet was listed in the results pane 804, the currently selected service condition symbol 402 could be thought of as meaning: "If service is Telnet . . . " If a list of services appeared in the results pane 804, comprising the services FTP, Telnet, and SMTP, then the currently selected service condition symbol 402 would mean "If service is (ftp, Telnet, or SMTP) . . . "

When the administration component 206 displays a service or list of services in the results pane 804, a service or list can be further configured by selecting the service or list in the results pane 804 and selecting the Properties button 812. Alternatively, a user can double-click on a service or list in the results pane 804. In either case, in response the administration component displays a properties dialog over the Service Dialog 800. The properties dialog enables the user to specifically configure the selected service.

Figure 8B:
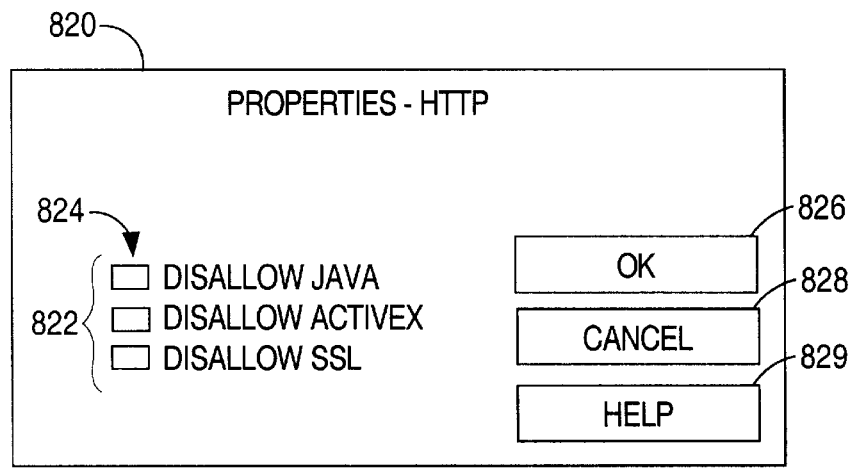
FIG. 8B is a diagram of a properties dialog.

Every defined service has additional configuration options that can be set and that are reflected in a particular properties dialog. For instance, in the case of the HTTP service, the administration component displays an HTTP properties dialog 820 as shown in FIG. 8B. The properties dialog 820 comprises checkboxes 822 that describe restrictions that can be placed upon the processing of packets in the selected service. For example, for the HTTP service, the user can check a "Disallow Java" checkbox 824. This action instructs the administration component 206 that when an HTTP packet is evaluated, the firewall or gateway should disallow or reject packets containing or relating to Java applets. The checkbox descriptions shown in FIG. 8B are merely exemplary, and it should be understood that each service has specific restriction checkboxes, and any number of such restrictions can be provided.

The options that are checked apply only if the service condition ultimately leads to an Accept condition. If it does, then as the packets for HTTP pass through the firewall or gateway, the firewall or gateway will refer to the options set for that packet's service condition. If a packet for HTTP was accepted via the service condition in the example above, the packet would be allowed, but any data regarding Java would be rejected, and all other HTTP packet data would be allowed.

Figure 8C:
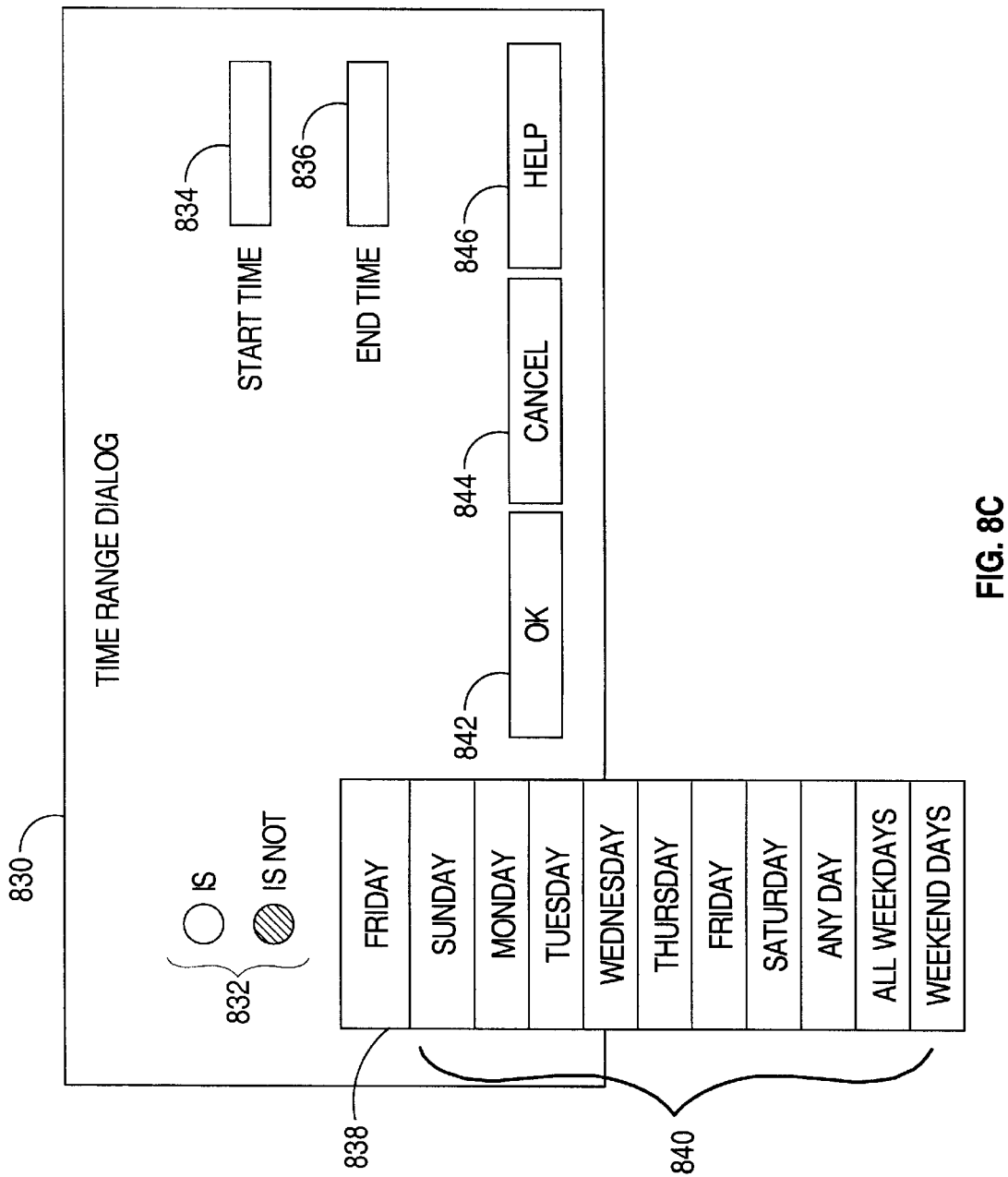
FIG. 8C is a diagram of a time range dialog.

When the user is adding a new time range symbol 404 to a policy, the administration component 206 displays a time range dialog 830 as shown in FIG. 8C. The time range dialog has a radio button group 832 that display "Is" or "Is Not" options. The time range dialog has a "Start Time" edit field 834 and an "End Time" edit field 836. A pulldown list 840 enables the user to enter a selected choice of day 838 from among a list of weekdays. A standard OK button 842, Cancel button 844, and Help button 846 are provided.

The time range dialog 830 enables the user to associate a particular range of hours on a particular day with the new time range symbol 404. For example, the user clicks on the "IS NOT" button in the radio button group 832, enters "0900" in the Start Time edit field 834, enters "1700" in the End Time edit field 836, and enters "Friday" as the selected day 838 from the pulldown list 840. This applies, to the current time range symbol 404, the meaning "If Time of Day Is Not 9:00 a.m. to 5:00 p.m. on Friday . . . "

The time range dialog 830 enables a range of time to be specified for any day, a given day of the week, all weekdays, or weekend days. Additionally, using the Boolean choices provided by the "Is" and "Is Not" radio button group 832, the policy effectively means either: "If Time Range is (startTime) to (endTime) on (chosen day) . . . " or "If Time Range is NOT (startTime) to (endTime) on (chosen day) . . . " This provides maximum flexibility in establishing policy conditions.

Figure 8D:
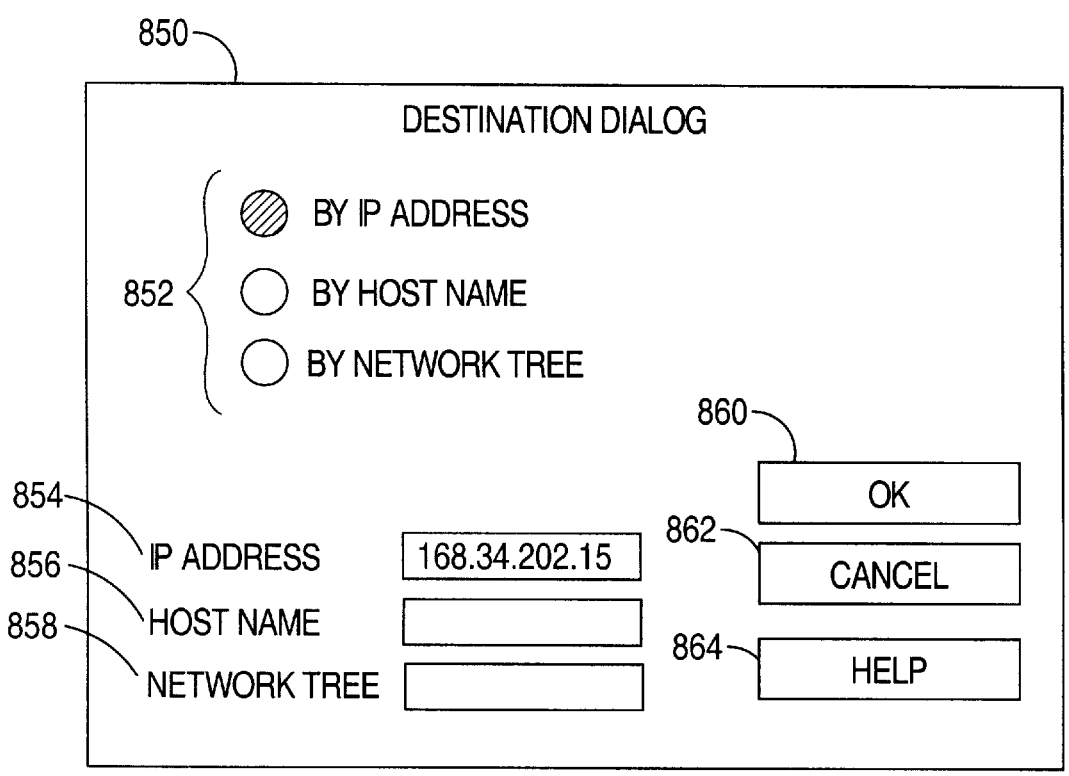
FIG. 8D is a diagram of a destination dialog.

When the user is entering a new destination condition symbol 406, the administration component displays a destination dialog 850 as shown in FIG. 8D. The destination dialog 850 has a radio button group 852 that enables a user to select the destination referenced by the symbol "by IP address", "by Host Name", or "by Network Tree". The destination dialog 850 also has fields allowing entry of an IP address in a custom IP edit field 854, a host name in a standard edit field 856, or by the network tree 314 using a tree control 858. The standard OK, Cancel, and Help buttons 860, 862, 864 are also provided.

The destination dialog 850 allows a destination host to be identified and referenced in a policy. The destination is entered either by explicitly entering the IP address in the custom IP edit field 854, by entering a domain name representing the address in the global DNS table using the edit field 856, or by selecting an object defined in the network tree 314. When the network tree 314 is used, the system obtains the IP address from a node of the network tree. IP addresses of objects in the network tree are defined when the network tree is constructed.

As shown in FIG. 8D by way of example, if the "by IP Address" button is selected from the radio button group 852, the IP address field in the bottom panel is enabled, and the user may enter an IP address, such as "168.34.202.15". If the "by Host Name" button is selected, then a field in the bottom panel will be enabled, allowing the entry of a host name, such as "centri.cisco.com". When a host name is entered, in response the administration component carries out a DNS lookup and attempts to resolve the host name to its associated IP address. When the "by Network Tree" button is selected, the tree control 858 is enabled, displaying a replica of the network tree 314. The user may then select any object in the network tree 314 as the destination.

When the user clicks on the Save button 860, the information entered in the destination dialog 850 is stored in association with the currently selected destination symbol 406. Thus, entry of an address by any of the three methods in the dialog 850 enables the user to specify that a destination symbol means policy logic such as "If destination is 204.233.109.108 . . . ".

In-Line Help

In an alternative embodiment, the administration component 206 displays help information when a particular command is disabled in the current context. The help information explains to the user why a particular menu item is disabled in the context. For example, the first pop-up menu 422 has a Validation Help command. When the Validation Help command is selected, the administration component 206 displays a help window that contains text explaining which commands are allowed or invalid in the current context, and explaining why unavailable commands are unavailable.

Such help information is useful, for example, when a user attempts to change a service condition symbol to another symbol, but the current service condition symbol has an Accept symbol 412 attached to it. In this case, the user might not know that the user must first remove the Accept symbol 412 before the change can be carried out. The help information provides an explanation.

Logical Keywords

In another alternate embodiment, the administration component 206 displays logical labels adjacent to each vertical line 418 and angled line 420 that appears in a symbolic policy tree. For example, in one embodiment, the word THEN is displayed adjacent to each angled line 420, and the word ELSE is displayed adjacent to each vertical line 418. Alternatively, the words are YES and NO, or TRUE and FALSE. The words serve as visual cues to assist the user in remembering and understanding the meaning of the connecting lines 418, 420.

Wizard

In another alternative embodiment, a policy building wizard is provided that assists a user in constructing an exemplary policy. The policy building wizard is a function of the administration component 206. When the policy building wizard is invoked, the administration component displays a dialogue that explains how to construct a policy. The user follows the dialogue and moves the mouse and selects commands as instructed according to the dialogue. Use of the wizard enables a new user to rapidly understand how the symbols are connected together and the meaning of the corresponding logic.

EXAMPLE POLICY

The mechanisms described above are used to define a graphic display, a script, and firewall instructions that reflect abstract network security policies. For example, consider a hypothetical company, Acme Corporation, which has employees organized as engineering, marketing, and administration departments. The administration employees do not need access to the Internet except to use electronic mail (email). The engineering group uses anonymous file transfer protocol (FTP) to transfer files to satellite offices, accesses USENET newsgroups for solutions, and browses World Wide Web sites to look for software patches. The marketing group uses the Web for market research. Acme's standard security policy prohibits Acme systems from receiving Active-X or Java applets that can contain malicious code.

In this example, a set of suitable security policies is:

(P1) If the user is sending or receiving email, allow the user to do so.

(P2) If the user is in engineering or marketing and is requesting Web services, allow them to do so, but block or filter out ActiveX controls and Java applets (P3) Only allow FTP to be used by the engineering group.

FIG. 6 is a diagram of symbols that graphically define security policies P1, P2, and P3. Security policy P1 is defined by a first service symbol 602 and a first Accept symbol 604. Using the Properties command 430, the user sets a service type property of the first service symbol 602 to "EMAIL". Accordingly, the script statement corresponding to symbols 602, 604 is:

If Service Is EMAIL THEN Accept OTHERWISE . . . .

The second symbol 606 and successive symbols define actions to take under the policy when the OTHERWISE condition is satisfied. In other words, symbols on or below the OTHERWISE path 603 define what to do when the OTHERWISE condition is satisfied.

Security policy P2 is defined by symbols 606–618. A second service condition symbol 606 has the property "World Wide Web". The THEN path of the second service condition symbol 606 leads to a first destination symbol 608 having a destination type property of "Engineering." The first destination symbol 608 is coupled by an OR relationship to a second destination symbol 610 having a destination type property of "Marketing." The THEN path of the second destination symbol 610 leads to a third service condition symbol 614 having a service type property of "Applet/Control". The THEN path of the third service condition symbol 614 leads to a first Reject symbol 616. The OTHERWISE path of the third service condition symbol 614 leads to a second Accept symbol 618. The second destination symbol 610 has no OTHERWISE path. The OTHERWISE path of the first destination symbol 608 leads to a second Reject symbol 612.

Thus, taken together, symbols 606–618 reflect the policy statements shown in Table 1.

TABLE 1—POLICY SCRIPT FOR POLICY P2

If Service Is WORLD WIDE WEB
THEN If Destination Is ENGINEERING
  OR If Destination Is MARKETING
  THEN If Service Is APPLET/CONTROL
    THEN Reject
    OTHERWISE Accept
  OTHERWISE Reject
OTHERWISE [control is passed to symbol 620]

The OTHERWISE path of the second service condition symbol 606 leads to a third service condition symbol 620.

Security policy P3 is defined by the third service condition symbol 620 and symbols 622, 624, 626. The third service condition symbol 620 has a condition type property of "FTP". The THEN path of the third service condition symbol 620 leads to a third destination symbol 622 having a destination type property of "ENGINEERING". The THEN path of the third destination symbol 622 leads to a third Accept symbol 626. The OTHERWISE path of the third destination symbol 622 leads to a third Reject symbol 624. The OTHERWISE path of the third service condition symbol 620 leads to a Use Next Policy symbol 628.

Thus, symbols 620–626 reflect policy logic as follows:

If Service Is FTP
   THEN If Destination Is ENGINEERING
     THEN Accept
     OTHERWISE Reject
   OTHERWISE Use Next Policy The Use Next Policy symbol 628 effectively transfers control from the current policy to the next policy defined in the policy tree. In this context, "next policy" refers to that policy that is immediately superior to the current policy in the hierarchy of the policy tree.

APPLYING SECURITY POLICIES

Figure 9:
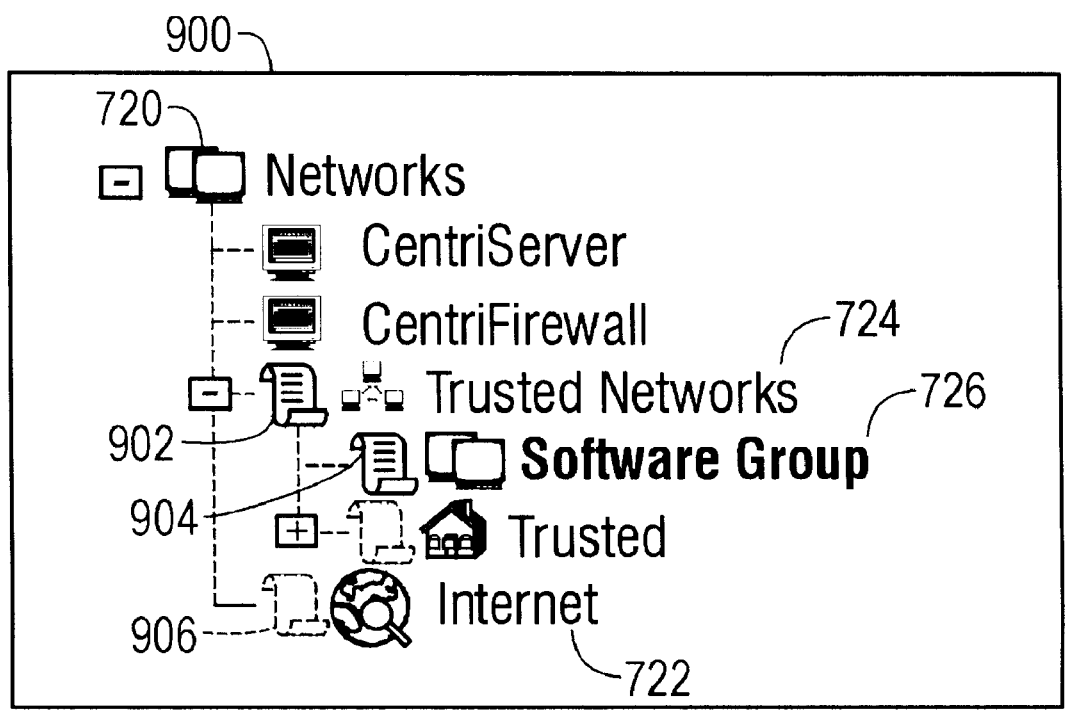
FIG. 9 is a diagram of a network tree having policies applied to nodes of the tree.

Administrators can apply security policies to an entire network, a subnet, or a single host, as well as to all trusted, non-trusted, and unknown networks. Once a security policy is written, the policy is given a name that is saved in association with the policy. Each named policy is displayed in the policy tree 316 of the network viewer pane 310. Each named policy has a policy icon 319 displayed adjacent to its name. Administrators may apply a policy to any network object that they want to protect using that policy. For example, FIG. 9 shows a portion 900 of the network viewer pane 310 that contains a Networks tree 720. To apply a policy to a network object in the Networks tree 720, the administrator selects one of the policy icons 319, drags it from the policy tree 316 to a network object in the Networks tree, and drops the icon on the network object.

As shown in FIG. 9, the Networks tree 720 includes a Trusted Networks object 724, a Software Group object 726, and an Internet object 722. Policy icons 902, 904 indicate that security policies have been applied to the Trusted Networks object 724 and Software Group object 726, respectively, using the process described above. A ghost policy icon 906 indicates that no policy is associated with the Internet object 722.

If an administrator has defined logical network groupings, the administrator can apply a security policy to the individual network objects that comprise those groups or to the groups themselves. As shown in FIG. 9, a policy represented by policy icon 904 has been applied to the software group represented by the Software Group object 726. Thus, administrators apply the security policies only where needed. For homogenous networks in which all hosts run the Microsoft Windows® operating system, administrators can apply security policies to common network objects, such as Windows NT Domains, Group accounts, or individual User accounts. Such network objects are automatically discovered in the network by the administration component 206, and remain current with the users in the domain.

Policy Inheritance

Preferably, the administration component 206 provides a mechanism for enforcing policy inheritance. In this context, "policy inheritance" refers to the use of recursive lists of security policies. When a security policy on a lower node of the Networks tree 720 has the Use Next Policy symbol 416 applied to a condition branch (or if the node has no policy attached), then the next policy up in the Networks tree and in the direct path of that node is applied. For example, in FIG. 9, if the policy represented by policy icon 904 terminates in a Use Next Policy symbol 416, then in evaluating that policy, upon reaching the Use Next Policy symbol the administration component proceeds to the policy represented by policy icon 902. Thus, if the security policy applied to the Software Group object 726 fails to satisfy the conditions of a session request and it includes the Use Next Policy symbol 416, then the security policy attached to Trusted Networks is used to evaluate the session request.

Policy inheritance is transferred all the way up to the Trusted Networks object 724 or Internet object 722 if the policies below those branches use the Use Next Policy terminal node.

In the example of FIG. 9, the security policy applied to the Software Group node and represented by policy icon 904 can contain condition statements that are specific to that logical group, but it can inherit any condition statements included in the security policy applied to the Trusted Networks object 724 and represented by policy icon 902.

Policy inheritance provides flexible design and enforcement of an organization's network security policy. It also eases the burden of managing large networks.

In the preferred embodiment, the administration component 206 also enforces dominance. Dominance is an attribute of the most-specific network object to which a security policy is applied. Dominance operates in the following manner. If the parameters of a session request match two security policies within a direct path, the policy attached to the most specific network object defined in that path is applied to that session. The rules for policy inheritance are processed according to the hierarchical arrangement of the Networks tree 720.

Because administrators can apply security policies to different types of network objects that can actually represent the same network object (such as a Windows NT user on a specific host), they must understand the order in which security policies are applied. The present system assumes that if administrators want to apply a security policy to a specific user, then the security policy applied to a user should take precedence over a security policy applied to the computer from which the user is logging in.

Accordingly, security policies are evaluated in the following order:

1. Domains, Group accounts, and User accounts of the network operating system, such as Microsoft Windows NT®;
2. Logical Networks;
3. Physical Networks.

The benefits of policy inheritance are most obvious when managing large networks, multiple departments, or numerous users and workstations requiring special privileges. Using policy inheritance allows administrators to tune their network's security based on the "exceptional" needs of specific users. In this context, "exceptional" needs are needs that do not apply to most users of their network. More general policies, which are policies that are applicable to most of the network, are applied to the higher-level nodes within the Networks tree. On the lower-level nodes of the Networks tree, administrators can append exceptions to those general policies using more specific policies.

HARDWARE OVERVIEW

Figure 10:
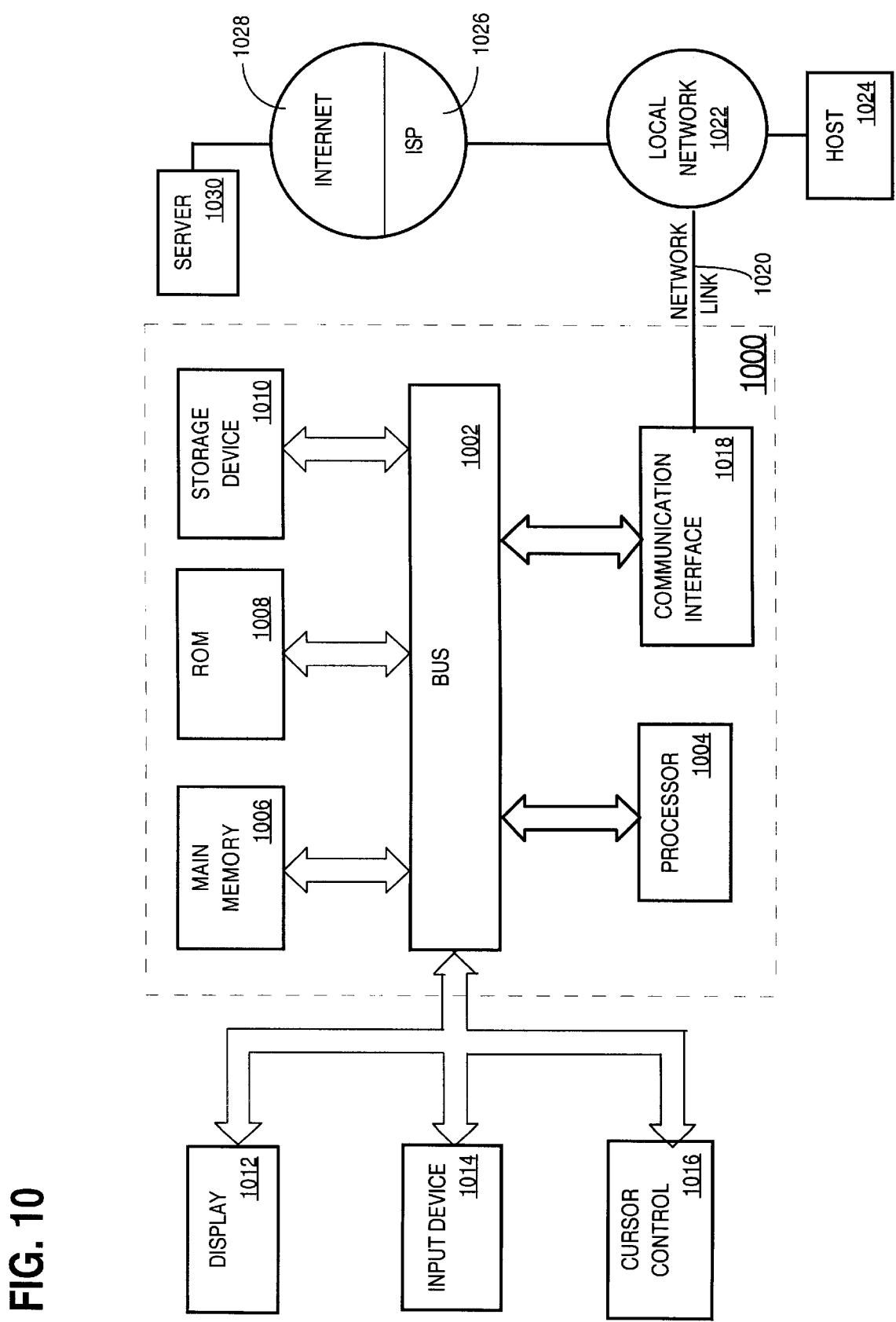
FIG. 10 is a block diagram of a computer system that can be used to implement the system described herein.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for graphical network security policy management. According to one embodiment of the invention, graphical network security policy management is provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for graphical network security policy management as described herein.

The received code may be executed by processor 1004 as it is received, and/or stored in storage device 1010, or other non-volatile storage for later execution. In this manner, computer system 1000 may obtain application code in the form of a carrier wave.

CONCLUSIONS, EXTENSIONS, ADVANTAGES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Decision tree-based security policies provide a better development model for network security policies than rule-based models. By using decision trees to construct security policies, administrators can define security policies that they understand. Decision trees closely match the human description of a security policy. Decision trees also allow logarithmic evaluations instead of linear evaluations, which allows the firewall servers to perform computations much faster, freeing up valuable system resources. However, decision trees alone cannot solve many problems inherent in maintaining rule-based security policies.

To overcome the breadth of shortcomings in ordered lists, the present system combines decision trees with other tree structures. Using a tree to organize the network service settings, administrators can construct bundles that reflect the actual user applications that they want to control, which isolates the particulars of a user application. Because administrators reference these bundles in security policies, they can easily modify the network services contained within those bundles, which applies the modifications automatically and consistently across all of the security policies that reference the bundles.

By organizing the particulars of an organization's network within a tree and applying security policies to the logical groups that they define, administrators can apply security policies consistently across any collection of network objects. Using logical groupings allows administrators to easily add or remove network objects without modifying the security policies applied to the logical groups that contain them. This grouping mechanism also makes changes and exceptions easier and more logical, and it isolates network service definitions from the particulars of a network's organization.

By incorporating existing network user models, such as the Windows NT domain authentication model, within these logical groupings, administrators can define security policies that roam with their users to different network objects and physical networks. Because all network objects, including the logical groupings, are members of a site, administrators actually define security policies that control the traffic leaving the site. By applying the security policies to a particular site, administrators can focus on the security policy of the site without focusing on the firewall server through which the network traffic passes. Adding firewall servers to and removing them from a site is simple because the security policies remain independent of the particulars of the firewall servers.

By removing the particulars of networks and firewall servers from security policy and network service definitions, we also solve the problems associated with porting rule-based security policies. Instead of being a tedious translation task, porting a decision-tree based security policy simply requires creating and organizing the new network objects within a new tree and applying an existing security policy to the new tree. This ability allows administrators of large, multi-firewall, multi-location organizations to develop, apply, and maintain security policies that consistently protect all of their organization's informational resources.

The invention is not limited to the context shown in FIGS. 1 and 5, and the spirit and scope of the invention include other contexts and applications in which the upgrade and diagnostic functions described herein are available to other mechanisms, methods, programs, and processes. The specification and drawings are, accordingly, to be regarded in an illustrative rather than a restrictive sense.

What is claimed is:

1. A method for controlling a network device that passes or rejects information messages, the method comprising the computer-implemented steps of:

defining a set of symbols that identify logical operations that can be carried out by the network device;

defining an information communication policy for the network device by graphically interconnecting one or more of the symbols into a symbolic representation of the policy; and generating a set of instructions based on the symbolic representation of the policy, wherein the set of instructions causes the network device to selectively pass or reject messages according to the policy, comprising the steps of generating a source script that defines the policy in a scripting language; and displaying the source script in a window of the user interface.

2. The method as recited in claim 1, further comprising the steps of:

after re-configuring the one or more symbols, highlighting a corresponding portion of the source script that is displayed in the window when one of the one or more symbols is selected by the user.

3. The method as recited in claim 1, further comprising the steps of:

naming the source script;

storing the source script in a database; and displaying, in a second window of the user interface, a list of one or more source scripts that are stored in the database.

4. A method for establishing a security policy that is enforced by a network device such as a router, the method comprising the steps of:

displaying a user interface, wherein the user interface comprises a first window that includes graphical symbols tat can be manipulated to define the security policy;

receiving editing commands that manipulate one or more symbols in the set of graphical symbols whereby the security policy is established based on the editing commands;

displaying a symbolic representation of the security policy in a second window of the user interface; and generating a set of instructions that are executable by the network device, whereby the network device enforces the security policy according to the symbolic representation, comprising the steps of generating a source script that defines the policy in a scripting language; and displaying the source script in a window of the user interface.

5. A method for associating a security policy with a network device, the method comprising the steps of:

displaying a first icon on a user interface, wherein the first icon is associated with a first, pre-defined security policy;

displaying a second icon on the user interface, wherein the second icon identifies the network device;

receiving user input that instructs the user interface to position the first icon near the second icon, comprising receiving user input that drags the first icon over the second icon; and in response thereto, applying the first security policy to the network device that is associated with the second icon.

6. A method for associating a security policy with a network device, the method comprising the steps of:

displaying a first icon on a user interface, wherein the first icon is associated with a first, pre-defined security policy;

displaying a second icon on the user interface, wherein the second icon identifies the network device;

receiving user input that instructs the user interface to position the first icon near the second icon;

in response thereto, applying the first security policy to the network device that is associated with the second icon;

displaying a network tree in a pane of the user interface, wherein the network tree includes a plurality of first icons organized in a hierarchy, in which each of the first icons represents one of a plurality of network objects in a network; and displaying a policy tree in a pane of the user interface, wherein the policy tree includes a plurality of second icons organized in a hierarchy, in which each of the second icons represents a pre-defined security policy that can be associated with and enforced by one of the network objects.

7. The method as recited in claim 6, further comprising the step of:

displaying a service tree in a pane of the user interface, wherein the service tree includes a plurality of third icons organized in a hierarchy, in which each of the third icons represents a pre-defined logical grouping of services that can be associated with and carried out by one of the network objects.

8. A method of establishing a representation of a network security policy, the method comprising the computer-implemented steps of:

storing a decision tree in a memory, wherein the decision tree is constructed by assembling one or more graphical symbols representing policy actions and policy conditions;

modifying one or more properties of one or more of the graphical symbols to create a logical representation of the policy;

transforming the logical representation into a textual script that represents the policy;

displaying the script;

when the policy representation is saved, translating the script into machine instructions that govern operation of a network device.

9. The method recited in claim 8, further comprising the steps of applying the policy representation to a second network device by moving an icon identifying the policy representation over an icon representing the second network device in a user interface display.

10. A computer-readable medium carrying one or more sequences of instructions for controlling a network device, wherein execution of the one or more sequences of instructions by one or more processors causes the one or more processors to perform the steps of:

defining a set of symbols that identify logical operations that can be carried out by the network device;

defining an information communication policy for the network device by graphically interconnecting one or more of the symbols into a symbolic representation of the policy; and generating a set of instructions based on the symbolic representation of the policy, wherein the set of instructions causes the network device to selectively pass or reject messages according to the policy, comprising the steps of generating a source script that defines the policy in a scripting language; and displaying the source script in a window of the user interface.

11. A computer data signal embodied in a carrier wave, the computer data signal carrying one or more sequences of instructions for controlling a network device, wherein execution of the one or more sequences of instructions by one or more processors causes the one or more processors to perform the steps of, defining a set of symbols that identify logical operations that can be carried out by the network device;

defining a data communication policy for the network device by graphically interconnecting one or more of the symbols into a symbolic representation of the policy; and generating a set of instructions based on the symbolic representation of the policy, wherein the set of instructions causes the network device to selectively pass or reject messages according to the policy, comprising the steps of generating a source script that defines the policy in a scripting language; and displaying the source script in a window of the user interface.

12. A computer apparatus comprising:

a processor; and a memory coupled to the processor, the memory containing one or more sequences of instructions for controlling a network device, wherein execution of the one or more sequences of instructions by the processor causes the processor to perform the steps of:

defining a set of symbols that identify logical operations that can be carried out by the network device;

defining a data communication policy for the network device by graphically interconnecting one or more of the symbols into a symbolic representation of the policy; and generating a set of instructions based on the symbolic representation of the policy, wherein the set of instructions causes the network device to selectively pass or reject messages according to the policy, comprising the steps of generating a source script that defines the policy in a scripting language; and displaying the source script in a window of the user interface.

13. The method as recited in claim 1, wherein the step of defining the set of symbols includes the steps of:

displaying the set of symbols in a window of a user interface;

receiving user input from a user input device coupled to the user interface, in which the user input defines how to manipulate the symbols to create the symbolic representation of the policy.

14. The method as recited in claim 1, wherein the step of defining the information communication policy includes the steps of:

receiving editing commands for re-configuring the symbolic representation;

re-configuring the one or more symbols into a revised symbolic representation of the policy based on the editing commands; and displaying the revised symbolic representation on the user interface.

15. The method as recited in claim 14, wherein the step of re-configuring the one or more symbols includes the steps of:

automatically validating the editing commands according to one or more syntactic rules and based on the context of the editing commands.

16. The method as recited in claim 1, wherein the step of generating the set of instructions comprises the steps of:

dynamically updating the set of instructions as the information communication policy is defined.

17. The method as recited in claim 1, wherein the step of generating the set of instructions comprises the steps of:

dynamically updating the set of instructions as the symbolic representation is re-configured.

* * * * *

UNITED STATES PATENT AND TRADEMARK OFFICE
CERTIFICATE OF CORRECTION

PATENT NO.     : 6,484,261 B1
DATED          : November 19, 2002
INVENTOR(S)    : Scott L. Wiegel It is certified that error appears in the above-identified patent and that said Letters Patent is hereby corrected as shown below:

<u>Column 32,</u>
Line 37, replace "tat" with -- that --.

Signed and Sealed this

Eighteenth Day of March, 2003

JAMES E. ROGAN
*Director of the United States Patent and Trademark Office*